(12) United States Patent
Zhang

(10) Patent No.: US 11,200,870 B2
(45) Date of Patent: *Dec. 14, 2021

(54) HOMOGRAPHY TRANSFORMATION MATRICES BASED TEMPERATURE CALIBRATION OF A VIEWING SYSTEM

(71) Applicant: Magic Leap, Inc., Plantation, FL (US)

(72) Inventor: Lei Zhang, Sunnyvale, CA (US)

(73) Assignee: Magic Leap, Inc., Plantation, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/034,982

(22) Filed: Sep. 28, 2020

(65) Prior Publication Data

US 2021/0012753 A1    Jan. 14, 2021

Related U.S. Application Data

(63) Continuation of application No. 16/430,252, filed on Jun. 3, 2019, now Pat. No. 10,825,424.
(Continued)

(51) Int. Cl.
*G06T 3/60* (2006.01)
*G09G 5/37* (2006.01)
(Continued)

(52) U.S. Cl.
CPC ............... *G09G 5/37* (2013.01); *G01K 13/00* (2013.01); *G02B 27/0172* (2013.01);
(Continued)

(58) Field of Classification Search
CPC ...... G09G 5/37; G09G 5/38; G09G 2320/041; G09G 2320/0693; G09G 2320/0666;
(Continued)

(56) References Cited

U.S. PATENT DOCUMENTS 4,344,092 A    8/1982 Miller
4,652,930 A    3/1987 Crawford
(Continued)

FOREIGN PATENT DOCUMENTS

EP    0535402 A1    4/1993
EP    1215522 A2    6/2002
(Continued)

OTHER PUBLICATIONS

Communication Pursuant to Article 94(3) EPC mailed on Sep. 4, 2019, European Patent Application No. 10793707.0, (4 pages).
(Continued)

*Primary Examiner* — Antonio A Caschera
(74) *Attorney, Agent, or Firm* — Stephen M. De Klerk

(57) ABSTRACT

A calibration set is stored on a storage device, including a plurality of temperatures and a plurality of homography transformation matrices, each respective homography transformation matrix being for a respective temperature. A temperature is detected. A respective one of the homography transformation matrices is selected for a temperature matching the temperature. A geometric change is calculated based on the selected homography relationship. Data representing local content is received. A rendering of the local content is generated based on the geometric change and displayed to a user.

21 Claims, 10 Drawing Sheets

Related U.S. Application Data

(60) Provisional application No. 62/681,063, filed on Jun. 5, 2018.

(51) Int. Cl.

| | | |
|---|---|---|
| *G06T 11/00* | (2006.01) | |
| *G09G 5/00* | (2006.01) | |
| *G02B 27/01* | (2006.01) | |
| *G01K 13/00* | (2021.01) | |
| *G06T 7/60* | (2017.01) | |
| *G02B 30/34* | (2020.01) | |

(52) U.S. Cl.
CPC ............... *G02B 30/34* (2020.01); *G06T 3/60* (2013.01); *G06T 7/60* (2013.01); *G06T 11/001* (2013.01); *G09G 5/006* (2013.01); *G02B 2027/014* (2013.01); *G02B 2027/0112* (2013.01); *G02B 2027/0134* (2013.01); *G06T 2207/10024* (2013.01); *G09G 2320/041* (2013.01); *G09G 2320/0666* (2013.01); *G09G 2320/0693* (2013.01)

(58) Field of Classification Search
CPC ... G06T 3/0075; G06T 3/0006; G06T 3/0068; G06T 3/60; G06T 7/60; G06T 11/001; G06T 2207/10024; G02B 30/34; G02B 27/0172; G02B 2027/0112; G02B 2027/0134
See application file for complete search history.

(56) References Cited

U.S. PATENT DOCUMENTS

| | | | |
|---|---|---|---|
| 4,810,080 A | 3/1989 | Grendol et al. | |
| 4,997,268 A | 3/1991 | Dauvergne | |
| 5,007,727 A | 4/1991 | Kahaney et al. | |
| 5,074,295 A | 12/1991 | Willis | |
| 5,240,220 A | 8/1993 | Elberbaum | |
| 5,410,763 A | 5/1995 | Bolle | |
| 5,455,625 A | 10/1995 | Englander | |
| 5,495,286 A | 2/1996 | Adair | |
| 5,497,463 A | 3/1996 | Stein et al. | |
| 5,682,255 A | 10/1997 | Friesem et al. | |
| 5,854,872 A | 12/1998 | Tai | |
| 5,864,365 A | 1/1999 | Sramek et al. | |
| 6,012,811 A | 1/2000 | Chao et al. | |
| 6,016,160 A | 1/2000 | Coombs et al. | |
| 6,076,927 A | 6/2000 | Owens | |
| 6,117,923 A | 9/2000 | Amagai et al. | |
| 6,124,977 A | 9/2000 | Takahashi | |
| 6,191,809 B1 | 2/2001 | Hori et al. | |
| 6,375,369 B1 | 4/2002 | Schneider et al. | |
| 6,538,655 B1 | 3/2003 | Kubota | |
| 6,541,736 B1 | 4/2003 | Huang et al. | |
| 6,757,068 B2 | 6/2004 | Foxlin | |
| 7,119,819 B1 | 10/2006 | Robertson et al. | |
| 7,431,453 B2 | 10/2008 | Hogan | |
| 7,542,040 B2 | 6/2009 | Templeman | |
| 7,573,640 B2 | 8/2009 | Nivon et al. | |
| 7,724,980 B1 | 5/2010 | Shenzhi | |
| 7,751,662 B2 | 7/2010 | Kleemann | |
| 7,758,185 B2 | 7/2010 | Lewis | |
| 8,120,851 B2 | 2/2012 | Iwasa | |
| 8,246,408 B2 | 8/2012 | Elliot | |
| 8,353,594 B2 | 1/2013 | Lewis | |
| 8,508,676 B2 | 8/2013 | Silverstein et al. | |
| 8,547,638 B2 | 10/2013 | Levola | |
| 8,619,365 B2 | 12/2013 | Harris et al. | |
| 8,696,113 B2 | 4/2014 | Lewis | |
| 8,698,701 B2 | 4/2014 | Margulis | |
| 8,733,927 B1 | 5/2014 | Lewis | |
| 8,736,636 B2 | 5/2014 | Kang | |
| 8,759,929 B2 | 6/2014 | Shiozawa et al. | |
| 8,793,770 B2 | 7/2014 | Lim | |
| 8,823,855 B2 | 9/2014 | Hwang | |
| 8,847,988 B2 | 9/2014 | Geisner et al. | |
| 8,874,673 B2 | 10/2014 | Kim | |
| 9,010,929 B2 | 4/2015 | Lewis | |
| 9,086,537 B2 | 7/2015 | Iwasa et al. | |
| 9,095,437 B2 | 8/2015 | Boyden et al. | |
| 9,239,473 B2 | 1/2016 | Lewis | |
| 9,244,293 B2 | 1/2016 | Lewis | |
| 9,244,533 B2 | 1/2016 | Friend et al. | |
| 9,383,823 B2 | 7/2016 | Geisner et al. | |
| 9,581,820 B2 | 2/2017 | Robbins | |
| 9,658,473 B2 | 5/2017 | Lewis | |
| 9,671,566 B2 | 6/2017 | Abovitz et al. | |
| 9,671,615 B1 | 6/2017 | Vallius et al. | |
| 9,696,795 B2 | 7/2017 | Marcolina et al. | |
| 9,874,664 B2 | 1/2018 | Stevens et al. | |
| 9,918,058 B2 | 3/2018 | Takahasi et al. | |
| 9,955,862 B2 | 5/2018 | Freeman et al. | |
| 9,996,797 B1 | 6/2018 | Holz et al. | |
| 10,018,844 B2 | 7/2018 | Levola et al. | |
| 10,082,865 B1 | 9/2018 | Raynal et al. | |
| 10,151,937 B2 | 12/2018 | Lewis | |
| 10,185,147 B2 | 1/2019 | Lewis | |
| 10,218,679 B1 | 2/2019 | Jawahar | |
| 10,241,545 B1 | 3/2019 | Richards et al. | |
| 10,317,680 B1 | 6/2019 | Richards et al. | |
| 10,516,853 B1 | 12/2019 | Gibson et al. | |
| 10,551,879 B1 | 2/2020 | Richards et al. | |
| 10,578,870 B2 | 3/2020 | Kimmel | |
| 10,825,424 B2 * | 11/2020 | Zhang | G02B 27/0172 |
| 2001/0010598 A1 | 8/2001 | Aritake et al. | |
| 2002/0063913 A1 | 5/2002 | Nakamura et al. | |
| 2002/0071050 A1 | 6/2002 | Homberg | |
| 2002/0122648 A1 | 9/2002 | Mule' et al. | |
| 2002/0140848 A1 | 10/2002 | Cooper et al. | |
| 2003/0048456 A1 | 3/2003 | Hill | |
| 2003/0067685 A1 | 4/2003 | Niv | |
| 2003/0077458 A1 | 4/2003 | Korenaga et al. | |
| 2003/0219992 A1 | 11/2003 | Schaper | |
| 2004/0001533 A1 | 1/2004 | Tran et al. | |
| 2004/0021600 A1 | 2/2004 | Wittenberg | |
| 2004/0042377 A1 | 3/2004 | Nikoloai et al. | |
| 2004/0174496 A1 | 9/2004 | Ji et al. | |
| 2004/0186902 A1 | 9/2004 | Stewart | |
| 2004/0201857 A1 | 10/2004 | Foxlin | |
| 2004/0240072 A1 | 12/2004 | Schindler et al. | |
| 2004/0246391 A1 | 12/2004 | Travis | |
| 2005/0001977 A1 | 1/2005 | Zelman | |
| 2005/0157159 A1 | 7/2005 | Komiya et al. | |
| 2005/0273792 A1 | 12/2005 | Inohara et al. | |
| 2006/0013435 A1 | 1/2006 | Rhoads | |
| 2006/0015821 A1 | 1/2006 | Parker et al. | |
| 2006/0038880 A1 | 2/2006 | Starkweather et al. | |
| 2006/0050224 A1 | 3/2006 | Smith | |
| 2006/0126181 A1 | 6/2006 | Levola | |
| 2006/0132914 A1 | 6/2006 | Weiss et al. | |
| 2006/0221448 A1 | 10/2006 | Nivon et al. | |
| 2006/0228073 A1 | 10/2006 | Mukawa et al. | |
| 2006/0250322 A1 | 11/2006 | Hall et al. | |
| 2006/0268220 A1 | 11/2006 | Hogan | |
| 2007/0058248 A1 | 3/2007 | Nguyen et al. | |
| 2007/0159673 A1 | 7/2007 | Freeman et al. | |
| 2007/0188837 A1 | 8/2007 | Shimizu et al. | |
| 2007/0204672 A1 | 9/2007 | Huang et al. | |
| 2007/0213952 A1 | 9/2007 | Cirelli | |
| 2007/0283247 A1 | 12/2007 | Brenneman et al. | |
| 2008/0002259 A1 | 1/2008 | Ishizawa et al. | |
| 2008/0002260 A1 | 1/2008 | Arrouy et al. | |
| 2008/0043334 A1 | 2/2008 | Itzkovitch et al. | |
| 2008/0063802 A1 | 3/2008 | Maula et al. | |
| 2008/0068557 A1 | 3/2008 | Menduni et al. | |
| 2008/0146942 A1 | 6/2008 | Dala-Krishna | |
| 2008/0205838 A1 | 8/2008 | Crippa et al. | |
| 2008/0316768 A1 | 12/2008 | Travis | |
| 2009/0153797 A1 | 6/2009 | Allon et al. | |
| 2009/0224416 A1 | 9/2009 | Laakkonen et al. | |
| 2009/0245730 A1 | 10/2009 | Kleemann | |
| 2009/0310633 A1 | 12/2009 | Ikegami | |

(56) References Cited

U.S. PATENT DOCUMENTS

| | | |
|---|---|---|
| 2010/0019962 A1 | 1/2010 | Fujita |
| 2010/0056274 A1 | 3/2010 | Uusitalo et al. |
| 2010/0063854 A1 | 3/2010 | Purvis et al. |
| 2010/0079841 A1 | 4/2010 | Levola |
| 2010/0232016 A1 | 9/2010 | Landa et al. |
| 2010/0232031 A1 | 9/2010 | Batchko et al. |
| 2010/0244168 A1 | 9/2010 | Shiozawa et al. |
| 2010/0296163 A1 | 11/2010 | Sarikko |
| 2011/0050655 A1 | 3/2011 | Mukawa |
| 2011/0122240 A1 | 5/2011 | Becker |
| 2011/0145617 A1 | 6/2011 | Thomson et al. |
| 2011/0170801 A1 | 7/2011 | Lu et al. |
| 2011/0218733 A1 | 9/2011 | Hamza et al. |
| 2011/0286735 A1 | 11/2011 | Temblay |
| 2011/0291969 A1 | 12/2011 | Rashid et al. |
| 2012/0050535 A1 | 3/2012 | Densham et al. |
| 2012/0075501 A1 | 3/2012 | Oyagi et al. |
| 2012/0081392 A1 | 4/2012 | Arthur |
| 2012/0113235 A1 | 5/2012 | Shintani |
| 2012/0154557 A1 | 6/2012 | Perez et al. |
| 2012/0218301 A1 | 8/2012 | Miller |
| 2012/0246506 A1 | 9/2012 | Knight |
| 2012/0249416 A1 | 10/2012 | Maciocci et al. |
| 2012/0249741 A1 | 10/2012 | Maciocci et al. |
| 2012/0307075 A1 | 12/2012 | Margalitq |
| 2012/0314959 A1 | 12/2012 | White et al. |
| 2012/0320460 A1 | 12/2012 | Levola |
| 2012/0326948 A1 | 12/2012 | Crocco et al. |
| 2013/0050833 A1 | 2/2013 | Lewis et al. |
| 2013/0051730 A1 | 2/2013 | Travers et al. |
| 2013/0077170 A1 | 3/2013 | Ukuda |
| 2013/0094148 A1 | 4/2013 | Sloane |
| 2013/0169923 A1 | 7/2013 | Schnoll et al. |
| 2013/0222386 A1 | 8/2013 | Tannhauser et al. |
| 2013/0278633 A1 | 10/2013 | Ahn et al. |
| 2013/0314789 A1 | 11/2013 | Saarikko et al. |
| 2013/0336138 A1 | 12/2013 | Venkatraman et al. |
| 2013/0342564 A1 | 12/2013 | Kinnebrew et al. |
| 2013/0342570 A1 | 12/2013 | Kinnebrew et al. |
| 2013/0342571 A1 | 12/2013 | Kinnebrew et al. |
| 2014/0016821 A1 | 1/2014 | Arth et al. |
| 2014/0022819 A1 | 1/2014 | Oh et al. |
| 2014/0078023 A1 | 3/2014 | Ikeda et al. |
| 2014/0082526 A1 | 3/2014 | Park et al. |
| 2014/0119598 A1 | 5/2014 | Ramachandran et al. |
| 2014/0126769 A1 | 5/2014 | Reitmayr et al. |
| 2014/0140653 A1 | 5/2014 | Brown et al. |
| 2014/0149573 A1 | 5/2014 | Tofighbakhsh et al. |
| 2014/0168260 A1 | 6/2014 | O'Brien et al. |
| 2014/0267419 A1 | 9/2014 | Ballard et al. |
| 2014/0274391 A1 | 9/2014 | Stafford |
| 2014/0282105 A1 | 9/2014 | Nordstrom |
| 2014/0359589 A1 | 12/2014 | Kodsky et al. |
| 2014/0375680 A1 | 12/2014 | Ackerman et al. |
| 2015/0005785 A1 | 1/2015 | Olson |
| 2015/0009099 A1 | 1/2015 | Queen |
| 2015/0077312 A1 | 3/2015 | Wang |
| 2015/0123966 A1 | 5/2015 | Newman |
| 2015/0130790 A1 | 5/2015 | Vazquez, II et al. |
| 2015/0134995 A1 | 5/2015 | Park et al. |
| 2015/0138248 A1 | 5/2015 | Schrader |
| 2015/0155939 A1 | 6/2015 | Oshima et al. |
| 2015/0205126 A1 | 7/2015 | Schowengerdt |
| 2015/0235431 A1 | 8/2015 | Schowengerdt |
| 2015/0253651 A1 | 9/2015 | Russell et al. |
| 2015/0256484 A1 | 9/2015 | Cameron |
| 2015/0269784 A1 | 9/2015 | Miyawaki et al. |
| 2015/0294483 A1 | 10/2015 | Wells et al. |
| 2015/0301955 A1 | 10/2015 | Yakovenko et al. |
| 2015/0338915 A1 | 11/2015 | Publicover et al. |
| 2015/0355481 A1 | 12/2015 | Hilkes et al. |
| 2016/0004102 A1 | 1/2016 | Nisper et al. |
| 2016/0027215 A1 | 1/2016 | Burns et al. |
| 2016/0077338 A1 | 3/2016 | Robbins et al. |
| 2016/0085300 A1 | 3/2016 | Robbins et al. |
| 2016/0091720 A1 | 3/2016 | Stafford et al. |
| 2016/0093099 A1 | 3/2016 | Bridges |
| 2016/0123745 A1 | 5/2016 | Cotier et al. |
| 2016/0155273 A1 | 6/2016 | Lyren et al. |
| 2016/0180596 A1 | 6/2016 | Gonzalez del Rosario |
| 2016/0202496 A1 | 7/2016 | Billetz et al. |
| 2016/0217624 A1 | 7/2016 | Finn et al. |
| 2016/0266412 A1 | 9/2016 | Yoshida |
| 2016/0267708 A1 | 9/2016 | Nistico et al. |
| 2016/0274733 A1 | 9/2016 | Hasegawa et al. |
| 2016/0300388 A1 | 10/2016 | Stafford et al. |
| 2016/0321551 A1 | 11/2016 | Priness et al. |
| 2016/0327798 A1 | 11/2016 | Xiao et al. |
| 2016/0334279 A1 | 11/2016 | Mittleman et al. |
| 2016/0357255 A1 | 12/2016 | Lindh et al. |
| 2016/0370404 A1 | 12/2016 | Quadrat et al. |
| 2016/0370510 A1 | 12/2016 | Thomas |
| 2017/0038607 A1 | 2/2017 | Camara |
| 2017/0061696 A1 | 3/2017 | Li et al. |
| 2017/0100664 A1 | 4/2017 | Osterhout et al. |
| 2017/0115487 A1 | 4/2017 | Travis |
| 2017/0122725 A1 | 5/2017 | Yeoh et al. |
| 2017/0123526 A1 | 5/2017 | Trail et al. |
| 2017/0127295 A1 | 5/2017 | Black et al. |
| 2017/0131569 A1 | 5/2017 | Aschwanden et al. |
| 2017/0147066 A1 | 5/2017 | Katz et al. |
| 2017/0160518 A1 | 6/2017 | Lanman et al. |
| 2017/0161951 A1 | 6/2017 | Fix et al. |
| 2017/0185261 A1 | 6/2017 | Perez et al. |
| 2017/0192239 A1 | 7/2017 | Nakamura et al. |
| 2017/0205903 A1 | 7/2017 | Miller et al. |
| 2017/0206668 A1 | 7/2017 | Poulos et al. |
| 2017/0213388 A1 | 7/2017 | Margolis et al. |
| 2017/0232345 A1 | 8/2017 | Rofougaran et al. |
| 2017/0235126 A1 | 8/2017 | DiDomenico |
| 2017/0235142 A1 | 8/2017 | Wall et al. |
| 2017/0235144 A1 | 8/2017 | Piskunov et al. |
| 2017/0235147 A1 | 8/2017 | Kamakura |
| 2017/0243403 A1 | 8/2017 | Daniels et al. |
| 2017/0254832 A1 | 9/2017 | Ho et al. |
| 2017/0281054 A1 | 10/2017 | Stever et al. |
| 2017/0287376 A1 | 10/2017 | Bakar et al. |
| 2017/0293141 A1 | 10/2017 | Schowengerdt et al. |
| 2017/0307886 A1 | 10/2017 | Stenberg et al. |
| 2017/0307891 A1 | 10/2017 | Bucknor et al. |
| 2017/0312032 A1 | 11/2017 | Amanatullah et al. |
| 2017/0322426 A1 | 11/2017 | Tervo |
| 2017/0329137 A1 | 11/2017 | Tervo |
| 2017/0332098 A1 | 11/2017 | Rusanovskyy et al. |
| 2017/0357332 A1 | 12/2017 | Balan et al. |
| 2018/0014266 A1 | 1/2018 | Chen |
| 2018/0059305 A1 | 3/2018 | Popovich et al. |
| 2018/0067779 A1 | 3/2018 | Pillalamarri et al. |
| 2018/0070855 A1 | 3/2018 | Eichler |
| 2018/0082480 A1 | 3/2018 | White et al. |
| 2018/0088185 A1 | 3/2018 | Woods et al. |
| 2018/0102981 A1 | 4/2018 | Kurtzman et al. |
| 2018/0108179 A1 | 4/2018 | Tomlin et al. |
| 2018/0114298 A1 | 4/2018 | Malaika et al. |
| 2018/0131907 A1 | 5/2018 | Schmirier et al. |
| 2018/0136466 A1 | 5/2018 | Ko |
| 2018/0144691 A1 | 5/2018 | Choi et al. |
| 2018/0189568 A1 | 7/2018 | Powderly et al. |
| 2018/0190017 A1 | 7/2018 | Mendez et al. |
| 2018/0191990 A1 | 7/2018 | Motoyama et al. |
| 2018/0250589 A1 | 9/2018 | Cossairt et al. |
| 2018/0357472 A1 | 12/2018 | Dreessen |
| 2019/0005069 A1 | 1/2019 | Filgueiras de Araujo et al. |
| 2019/0011691 A1 | 1/2019 | Peyman |
| 2019/0056591 A1 | 2/2019 | Tervo et al. |
| 2019/0087015 A1 | 3/2019 | Lam et al. |
| 2019/0101758 A1 | 4/2019 | Zhu et al. |
| 2019/0167095 A1 | 6/2019 | Krueger |
| 2019/0172216 A1 | 6/2019 | Ninan et al. |
| 2019/0178654 A1 | 6/2019 | Hare |
| 2019/0196690 A1 | 6/2019 | Chong et al. |
| 2019/0243123 A1 | 8/2019 | Bohn |
| 2019/0318540 A1 | 10/2019 | Piemonte et al. |
| 2019/0321728 A1 | 10/2019 | Imai et al. |

(56) References Cited

U.S. PATENT DOCUMENTS

| | | |
|---|---|---|
| 2019/0347853 A1 | 11/2019 | Chen et al. |
| 2020/0110928 A1 | 4/2020 | Al Jazaery et al. |
| 2020/0117267 A1 | 4/2020 | Gibson et al. |
| 2020/0117270 A1 | 4/2020 | Gibson et al. |
| 2020/0309944 A1 | 10/2020 | Thoresen et al. |
| 2020/0356161 A1 | 11/2020 | Wagner |
| 2020/0409528 A1 | 12/2020 | Lee |
| 2021/0008413 A1 | 1/2021 | Asikainen et al. |
| 2021/0033871 A1 | 2/2021 | Jacoby et al. |
| 2021/0041951 A1 | 2/2021 | Gibson et al. |
| 2021/0142582 A1 | 5/2021 | Jones et al. |
| 2021/0158627 A1 | 5/2021 | Cossairt et al. |

FOREIGN PATENT DOCUMENTS

| | | |
|---|---|---|
| EP | 1938141 A1 | 7/2008 |
| EP | 1943556 A2 | 7/2008 |
| EP | 3164776 B1 | 5/2017 |
| EP | 3236211 A1 | 10/2017 |
| EP | 2723240 B1 | 8/2018 |
| JP | 2003-029198 A | 1/2003 |
| JP | 2007-012530 A | 1/2007 |
| JP | 2009-244869 A | 10/2009 |
| JP | 2012-015774 A | 1/2012 |
| JP | 2016-85463 A | 5/2016 |
| JP | 6232763 B2 | 11/2017 |
| TW | 201803289 A | 1/2018 |
| WO | 2002/071315 A2 | 9/2002 |
| WO | 2006132614 A1 | 12/2006 |
| WO | 2007/085682 A1 | 8/2007 |
| WO | 2007/102144 A1 | 9/2007 |
| WO | 2008148927 A1 | 12/2008 |
| WO | 2009/101238 A1 | 8/2009 |
| WO | 2013/049012 A1 | 4/2013 |
| WO | 2015143641 A1 | 10/2015 |
| WO | 2016/054092 A1 | 4/2016 |
| WO | 2017004695 A1 | 1/2017 |
| WO | 2017120475 A1 | 7/2017 |
| WO | 2018/044537 A1 | 3/2018 |
| WO | 2018087408 A1 | 5/2018 |
| WO | 2018166921 A1 | 9/2018 |
| WO | 2019148154 A1 | 8/2019 |
| WO | 2020010226 A1 | 1/2020 |

OTHER PUBLICATIONS

Examination Report dated Jun. 19, 2020, European Patent Application No. 20154750.2, (10 pages).
Extended European Search Report dated May 20, 2020, European Patent Application No. 20154070.5, (7 pages).
Extended European Search Report dated Jun. 12, 2017, European Patent Application No. 16207441.3, (8 pages).
Final Office Action dated Aug. 10, 2020, U.S. Appl. No. 16/225,961, (13 pages).
Final Office Action dated Dec. 4, 2019, U.S. Appl. No. 15/564,517, (15 pages).
Final Office Action dated Feb. 19, 2020, U.S. Appl. No. 15/552,897, (17 pages).
International Search Report and Written Opinion dated Mar. 12, 2020, International PCT Patent Application No. PCT/US19/67919, (14 pages).
International Search Report and Written Opinion dated Aug. 15, 2019, International PCT Patent Application No. PCT/US19/33987, (20 pages).
International Search Report and Written Opinion dated Jun. 15, 2020, International PCT Patent Application No. PCT/US2020/017023, (13 pages).
International Search Report and Written Opinion dated Oct. 16, 2019, International PCT Patent Application No. PCT/US19/43097, (10 pages).
International Search Report and Written Opinion dated Oct. 16, 2019, International PCT Patent Application No. PCT/US19/36275, (10 pages).
International Search Report and Written Opinion dated Oct. 16, 2019, International PCT Patent Application No. PCT/US19/43099, (9 pages).
International Search Report and Written Opinion dated Jun. 17, 2016, International PCT Patent Application No. PCT/FI2016/050172, (9 pages).
International Search Report and Written Opinion dated Oct. 22, 2019, International PCT Patent Application No. PCT/US19/43751, (9 pages).
International Search Report and Written Opinion dated Dec. 23, 2019, International PCT Patent Application No. PCT/US19/44953, (11 pages).
International Search Report and Written Opinion dated May 23, 2019, International PCT Patent Application No. PCT/US18/66514, (17 pages).
International Search Report and Written Opinion dated Sep. 26, 2019, International PCT Patent Application No. PCT/US19/40544, (12 pages).
International Search Report and Written Opinion dated Aug. 27, 2019, International PCT Application No. PCT/US2019/035245, (8 pages).
International Search Report and Written Opinion dated Dec. 27, 2019, International Application No. PCT/US19/47746, (16 pages).
International Search Report and Written Opinion dated Sep. 30, 2019, International Patent Application No. PCT/US19/40324, (7 pages).
International Search Report and Written Opinion dated Sep. 4, 2020, International Patent Application No. PCT/US20/31036, (13 pages).
International Search Report and Written Opinion dated Jun. 5, 2020, International Patent Application No. PCT/US20/19871, (9 pages).
International Search Report and Written Opinion dated Aug. 8, 2019, International PCT Patent Application No. PCT/US2019/034763, (8 pages).
International Search Report and Written Opinion dated Oct. 8, 2019, International PCT Patent Application No. PCT/US19/41151, (7 pages).
International Search Report and Written Opinion dated Jan. 9, 2020, International Application No. PCT/US19/55185, (10 pages).
International Search Report and Written Opinion dated Feb. 28, 2019, International Patent Application No. PCT/US18/64686, (8 pages).
International Search Report and Written Opinion dated Feb. 7, 2020, International PCT Patent Application No. PCT/US2019/061265, (11 pages).
International Search Report and Written Opinion dated Jun. 11, 2019, International PCT Application No. PCT/US19/22620, (7 pages).
Invitation to Pay Additional Fees dated Aug. 15, 2019, International PCT Patent Application No. PCT/US19/36275, (2 pages).
Invitation to Pay Additional Fees dated Oct. 22, 2019, International PCT Patent Application No. PCT/US19/47746, (2 pages).
Invitation to Pay Additional Fees dated Apr. 3, 2020, International Patent Application No. PCT/US20/17023, (2 pages).
Invitation to Pay Additional Fees dated Oct. 17, 2019, International PCT Patent Application No. PCT/US19/44953, (2 pages).
Non Final Office Action dated Nov. 19, 2019, U.S. Appl. No. 16/355,611, (31 pages).
Non Final Office Action dated Aug. 21, 2019, U.S. Appl. No. 15/564,517, (14 pages).
Non Final Office Action dated Jul. 27, 2020, U.S. Appl. No. 16/435,933, (16 pages).
Non Final Office Action dated Jun. 17, 2020, U.S. Appl. No. 16/682,911, (22 pages).
Non Final Office Action dated Jun. 19, 2020, U.S. Appl. No. 16/225,961, (35 pages).
Non Final Office Action dated Oct. 22, 2019, U.S. Appl. No. 15/859,277, (15 pages).
Non Final Office Action dated Sep. 1, 2020, U.S. Appl. No. 16/214,575, (40 pages).
Notice of Allowance dated Mar. 25, 2020, U.S. Appl. No. 15/564,517, (11 pages).

(56) References Cited

OTHER PUBLICATIONS

Summons to attend oral proceedings pursuant to Rule 115(1) EPC mailed on Jul. 15, 2019, European Patent Application No. 15162521.7, (7 pages).
Aarik, J. et al., "Effect of crystal structure on optical properties of TiO2 films grown by atomic layer deposition", Thin Solid Films; Publication [online]. May 19, 1998 [retrieved Feb. 19, 2020], Retrieved from the Internet: <URL: https://www.sciencedirect.com/science/article/pii/S0040609097001351?via%3Dihub>; DOI: 10.1016/S0040-6090(97)00135-1; see entire document, (2 pages).
Azom, , "Silica—Silicon Dioxide (SiO2)", AZO Materials; Publication [Online], Dec. 13, 2001 [retrieved Feb. 19, 2020], Retrieved from the Internet: <URL: https://www.azom.com/article.aspx?Article1D=1114>, (6 pages).
Goodfellow, , "Titanium Dioxide—Titania (TiO2)", AZO Materials Publication [online], Jan. 11, 2002 [retrieved Feb. 19, 2020]. Retrieved from the Internet: <URL https://www.azom.com/article.aspx?Article1 D=1179>, (9 pages).
Levola, T. , "Diffractive Optics for Virtual Reality Displays", Journal of the SID Eurodisplay 14/05, 2005, XP008093627, chapters 2-3, Figures 2 and 10, pp. 467-475.
Levola, Tapani , "Invited Paper: Novel Diffractive Optical Components for Near to Eye Displays—Nokia Research Center", SID 2006 Digest, 2006 SID International Symposium, Society for Information Display, vol. XXXVII, May 24, 2005, chapters 1-3, figures 1 and 3, pp. 64-67.
Memon, F. et al., "Synthesis, Characterization and Optical Constants of Silicon Oxycarbide", EPJ Web of Conferences; Publication [online]. Mar. 23, 2017 [retrieved Feb. 19, 2020).<URL: https://www.epj-conferences.org/articles/epjconf/pdf/2017/08/epjconf_nanop2017_00002.pdf> DOI: 10.1051/epjconf/201713900002, (8 pages).
Spencer, T. et al., "Decomposition of poly(propylene carbonate) with UV sensitive iodonium 11 salts", Polymer Degradation and Stability; (online]. Dec. 24, 2010 (retrieved Feb. 19, 2020]., <URL: http:/fkohl.chbe.gatech.edu/sites/default/files/linked_files/publications/2011Decomposition%of%20poly(propylene%20carbonate)%20with%20UV%20sensitive%20iodonium%20salts,pdf>; DOI: 10, 1016/j.polymdegradstab.2010, 12.003, (17 pages).
Weissel, et al., "Process cruise control: event-driven clock scaling for dynamic power management", Proceedings of the 2002 international conference on Compilers, architecture, and synthesis for embedded systems. Oct. 11, 2002 (Oct. 11, 2002) Retrieved on May 16, 2020 (May 16, 2020) from <URL: https://dl.acm.org/doi/pdf/10.1145/581630.581668>, p. 238-246.
"ARToolKit: Hardware", https://web.archive.org/web/20051013062315/http://www.hitl.washington.edu:80/artoolkit/documentation/hardware.htm (downloaded Oct. 26, 2020), Oct. 13, 2015, (3 pages).
Invitation to Pay Additional Fees dated Sep. 24, 2020, International Patent Application No. PCT/US2020/043596, (3 pages).
Notice of Allowance dated Oct. 5, 2020, U.S. Appl. No. 16/682,911, (27 pages).
Notice of Reason of Refusal dated Sep. 11, 2020 with English translation, Japanese Patent Application No. 2019-140435, (6 pages).
Azuma, Ronald T. , "A Survey of Augmented Reality", Presence Teleoperators and Virtual Environments 6, 4 (Aug. 1997), 355-385; https://web.archive.org/web/20010604100006/http://www.cs.unc.edu/~azuma/ARpresence.pdf (downloaded Oct. 26, 2020).
Azuma, Ronald T. , "Predictive Tracking for Augmented Reality", Department of Computer Science, Chapel Hill NC; TR95-007, Feb. 1995, 262 pages.
Bimber, Oliver et al., "Spatial Augmented Reality: Merging Real and Virtual Worlds", https://web.media.mit.edu/~raskar/book/BimberRaskarAugmentedRealityBook.pdf; published by A K Peters/CRC Press (Jul. 31, 2005); eBook (3rd Edition, 2007), (393 pages).
Jacob, Robert J. , "Eye Tracking in Advanced Interface Design", Human-Computer Interaction Lab, Naval Research Laboratory, Washington, D.C., date unknown. 2003, pp. 1-50.
Tanriverdi, Vildan et al., "Interacting With Eye Movements in Virtual Environments", Department of Electrical Engineering and Computer Science, Tufts University; Proceedings of the SIGCHI conference on Human Factors in Computing Systems, Apr. 2000, pp. 1-8.
European Search Report dated Oct. 15, 2020, European Patent Application No. 20180623.9, (10 pages).
Extended European Search Report dated Jan. 22, 2021, European Patent Application No. 18890390.0, (11 pages).
Extended European Search Report dated Nov. 3, 2020, European Patent Application No. 18885707.2, (7 pages).
Extended European Search Report dated Nov. 4, 2020, European Patent Application No. 20190980.1, (14 pages).
Final Office Action dated Nov. 24, 2020, U.S. Appl. No. 16/435,933, (44 pages).
International Search Report and Written Opinion dated Feb. 2, 2021, International PCT Patent Application No. PCT/US20/60550, (9 pages).
International Search Report and Written Opinion dated Dec. 3, 2020, International Patent Application No. PCT/US20/43596, (25 pages).
Non Final Office Action dated Jan. 26, 2021, U.S. Appl. No. 16/928,313, (33 pages).
Non Final Office Action dated Jan. 27, 2021, U.S. Appl. No. 16/225,961, (15 pages).
Non Final Office Action dated Nov. 5, 2020, U.S. Appl. No. 16/530,776, (45 pages).
"Phototourism Challenge", CVPR 2019 Image Matching Workshop. https://image matching-workshop, github.io., (16 pages).
Altwaijry, et al., "Learning to Detect and Match Keypoints with Deep Architectures", Proceedings of the British Machine Vision Conference (BMVC), BMVA Press, Sep. 2016, [retrieved on Jan. 8, 2021 (Jan. 8, 2021 )] < URL: http://www.bmva.org/bmvc/2016/papers/paper049/index.html >, en lire document, especially Abstract, pp. 1-6 and 9.
Arandjelović, Relja et al., "Three things everyone should know to improve object retrieval", CVPR, 2012, (8 pages).
Battaglia, Peter W. et al., "Relational inductive biases, deep learning, and graph networks", arXiv:1806.01261, Oct. 17, 2018, pp. 1-40.
Berg, Alexander C et al., "Shape matching and object recognition using low distortion correspondences", In CVPR, 2005, (8 pages).
Bian, Jiawang et al., "GMS: Grid-based motion statistics for fast, ultra-robust feature correspondence.", In CVPR (Conference on Computer Vision and Pattern Recognition), 2017, (10 pages).
Brachmann, Eric et al., "Neural-Guided RANSAC: Learning Where to Sample Model Hypotheses", In ICCV (International Conference on Computer Vision ), arXiv:1905.04132v2 [cs.CV] Jul. 31, 2019, (17 pages).
Butail, et al., "Putting the fish in the fish tank: Immersive VR for animal behavior experiments", In: 2012 IEEE International Conference on Robotics and Automation. May 18, 2012 (May 18, 2012) Retrieved on Nov. 14, 2020 (Nov. 14, 2020) from <http://lcdcl.umd.edu/papers/icra2012.pdf> entire document, (8 pages).
Caetano, Tibério S et al., "Learning graph matching", IEEE TPAMI, 31(6): 1048-1058, 2009.
Cech, Jan et al., "Efficient sequential correspondence selection by cosegmentation", IEEE TPAMI, 32(9): 1568-1581, Sep. 2010.
Cuturi, Marco , "Sinkhorn distances: Lightspeed computation of optimal transport", NIPS, 2013, (9 pages).
Dai, Angela et al., "ScanNet: Richly-annotated 3d reconstructions of indoor scenes", In CVPR, arXiv:1702.04405v2 [cs.CV] Apr. 11, 2017, (22 pages).
Deng, Haowen et al., "PPFnet: Global context aware local features for robust 3d point matching", In CVPR, arXiv:1802.02669v2 [cs.CV] Mar. 1, 2018, (12 pages).
Detone, Daniel et al., "Deep image homography estimation", In RSS Work- shop: Limits and Potentials of Deep Learning in Robotics, arXiv:1606.03798v1 [cs.CV] Jun. 13, 2016, (6 pages).
Detone, Daniel et al., "Self-improving visual odometry", arXiv:1812.03245, Dec. 8, 2018, (9 pages).
Detone, Daniel et al., "SuperPoint: Self-supervised interest point detection and description", In CVPR Workshop on Deep Learning for Visual SLAM, arXiv:1712.07629v4 [cs.CV] Apr. 19, 2018, (13 pages).

(56) References Cited

OTHER PUBLICATIONS

Dusmanu, Mihai et al., "D2-net: A trainable CNN for joint detection and description of local features", CVPR, arXiv:1905.03561v1 [cs.CV] May 9, 2019, (16 pages).
Ebel, Patrick et al., "Beyond cartesian representations for local descriptors", ICCV, arXiv:1908.05547v1 [cs.CV] Aug. 15, 2019, (11 pages).
Fischler, Martin A et al., "Random sample consensus: a paradigm for model fitting with applications to image analysis and automated cartography", Communications of the ACM, 24(6): 1981, pp. 381-395.
Gilmer, Justin et al., "Neural message passing for quantum chemistry", In ICML, arXiv: 1704.01212v2 [cs.LG] Jun. 12, 2017, (14 pages).
Hartley, Richard et al., "Multiple View Geometry in Computer Vision", Cambridge University Press, 2003, pp. 1-673.
Lee, et al., "Self-Attention Graph Pooling", Cornell University Library/Computer Science/ Machine Learning, Apr. 17, 2019 [retrieved on Jan. 8, 2021 from the Internet< URL: https://arxiv.org/abs/1904.08082 >, entire document.
Lee, Juho et al., "Set transformer: A frame- work for attention-based permutation-invariant neural networks", ICML, arXiv:1810.00825v3 [cs.LG] May 26, 2019, (17 pages).
Leordeanu, Marius et al., "A spectral technique for correspondence problems using pairwise constraints", Proceedings of (ICCV) International Conference on Computer Vision, vol. 2, pp. 1482-1489, Oct. 2005, (8 pages).
Li, Yujia et al., "Graph matching networks for learning the similarity of graph structured objects", ICML, arXiv: 1904.12787v2 [cs.LG] May 12, 2019, (18 pages).
Li, Zhengqi et al., "Megadepth: Learning single- view depth prediction from internet photos", In CVPR, fromarXiv: 1804.00607v4 [cs.CV] Nov. 28, 2018, (10pages).
Libovicky, et al., "Input Combination Strategies for Multi-Source Transformer Decoder", Proceedings of the Third Conference on Machine Translation (WMT). vol. 1: Research Papers, Belgium, Brussels, Oct. 31-Nov. 1, 2018; retrieved on Jan. 8, 2021 (Jan. 8, 2021) from < URL: https://doi.org/10.18653/v1/W18-64026 >, entire document, pp. 253-260.
Loiola, Eliane M. et al., "A survey for the quadratic assignment problem", European journal of operational research, 176(2): 2007, pp. 657-690.
Lowe, David G. , "Distinctive image features from scale- invariant keypoints", International Journal of Computer Vision, 60(2): 91-110, 2004, (28 pages).
Luo, Zixin et al., "ContextDesc: Local descriptor augmentation with cross-modality context", CVPR, arXiv:1904.04084v1 [cs.CV] Apr. 8, 2019, (14 pages).
Munkres, James , "Algorithms for the assignment and transportation problems", Journal of the Society for Industrial and Applied Mathematics, 5(1): 1957, pp. 32-38.
Ono, Yuki et al., "LF-Net: Learning local features from images", 32nd Conference on Neural Information Processing Systems (NIPS 2018), arXiv:1805.09662v2 [cs.CV] Nov. 22, 2018, (13 pages).
Paszke, Adam et al., "Automatic differentiation in Pytorch", 31st Conference on Neural Information Processing Systems (NIPS 2017), Long Beach, CA, USA, (4 pages).
Peyré, Gabriel et al., "Computational Optimal Transport", Foundations and Trends in Machine Learning, 11(5-6):355-607, 2019; arXiv:1803.00567v4 [stat.ML] Mar. 18, 2020, (209 pages).
Qi, Charles R. et al., "Pointnet++: Deep hierarchical feature learning on point sets in a metric space.", 31st Conference on Neural Information Processing Systems (NIPS 2017), Long Beach, CA, USA., (10 pages).
Qi, Charles R et al., "Pointnet: Deep Learning on Point Sets for 3D Classification and Segmentation", CVPR, arXiv:1612.00593v2 [cs.CV] 10 Apr 201, (19 pages).
Radenović, Filip et al., "Revisiting Oxford and Paris: Large-Scale Image Retrieval Benchmarking", CVPR, arXiv:1803.11285v1 [cs.CV] Mar. 29, 2018, (10 pages).
Raguram, Rahul et al., "A comparative analysis of ransac techniques leading to adaptive real-time random sample consensus", Computer Vision—ECCV 2008, 10th European Conference on Computer Vision, Marseille, France, Oct. 12-18, 2008, Proceedings, Part I, (15 pages).
Ranftl, René et al., "Deep fundamental matrix estimation", European Conference on Computer Vision (ECCV), 2018, (17 pages).
Revaud, Jerome et al., "R2D2: Repeatable and Reliable Detector and Descriptor", In NeurIPS, arXiv:1906.06195v2 [cs.CV] Jun. 17, 2019, (12 pages).
Rocco, Ignacio et al., "Neighbourhood Consensus Networks", 32nd Conference on Neural Information Processing Systems (NeurIPS 2018), Montréal, Canada, arXiv:1810.10510v2 [cs.CV] Nov. 29, 2018, (20 pages).
Rublee, Ethan et al., "ORB: An efficient alternative to SIFT or SURF", Proceedings of the IEEE International Conference on Computer Vision. 2564-2571. 2011; 10.1109/ICCV.2011.612654, (9 pages).
Sarlin, et al., "SuperGlue: Learning Feature Matching with Graph Neural Networks", Cornell University Library/Computer Science/ Computer Vision and Pattern Recognition, Nov. 26, 2019 [retrieved on Jan. 8, 2021 from the Internet< URL: https://arxiv.org/abs/1911.11763 >, entire document, especially.
Sattler, Torsten et al., "SCRAMSAC: Improving RANSAC's efficiency with a spatial consistency filter", ICCV, 2009: 2090-2097., (8 pages).
Schonberger, Johannes L. et al., "Pixelwise view selection for un-structured multi-view stereo", Computer Vision—ECCV 2016: 14th European Conference, Amsterdam, The Netherlands, Oct. 11-14, 2016, Proceedings, Part III, pp. 501-518, 2016.
Schonberger, Johannes L. et al., "Structure-from-motion revisited", Proceedings of the IEEE Conference on Computer Vision and Pattern Recognition (CVPR), 2016, pp. 4104-4113, (11 pages).
Sinkhorn, Richard et al., "Concerning nonnegative matrices and doubly stochastic matrices.", Pacific Journal of Mathematics, 1967, pp. 343-348.
Thomee, Bart et al., "YFCC100m: The new data in multimedia research", Communications of the ACM, 59(2):64-73, 2016; arXiv:1503.01817v2 [cs.MM] Apr. 25, 2016, (8 pages).
Torresani, Lorenzo et al., "Feature correspondence via graph matching: Models and global optimization", Computer Vision—ECCV 2008, 10th European Conference on Computer Vision, Marseille, France, Oct. 12-18, 2008, Proceedings, Part II, (15 pages).
Tuytelaars, Tinne et al., "Wide baseline stereo matching based on local, affinely invariant regions", BMVC, 2000, pp. 1-14.
Ulyanov, Dmitry et al., "Instance normalization: The missing ingredient for fast stylization", arXiv:1607.08022v3 [cs.CV] Nov. 6, 2017, (6 pages).
Vaswani, Ashish et al., "Attention is all you need", 31st Conference on Neural Information Processing Systems (NIPS 2017), Long Beach, CA, USA; arXiv: 1706.03762v5 [cs.CL] Dec. 6, 2017, (15 pages).
Veličković, Petar et al., "Graph attention networks", ICLR, arXiv:1710.10903v3 [stat.ML] Feb. 4, 2018, (12 pages).
Villani, Cédric , "Optimal transport: old and new", vol. 338. Springer Science & Business Media, Jun. 2008, pp. 1-998.
Wang, Xiaolong et al., "Non-local neural networks", CVPR, arXiv:1711.07971v3 [cs.CV] Apr. 13, 2018, (10 pages).
Wang, Yue et al., "Deep Closest Point: Learning representations for point cloud registration", ICCV, arXiv:1905.03304v1 [cs.CV] May 8, 2019, (10 pages).
Wang, Yue et al., "Dynamic Graph CNN for learning on point clouds", ACM Transactions on Graphics, arXiv:1801.07829v2 [cs.CV] Jun. 11, 2019, (13 pages).
Yi, Kwang M. et al., "Learning to find good correspondences", CVPR, arXiv:1711.05971v2 [cs.CV] May 21, 2018, (13 pages).
Yi, Kwang Moo et al., "Lift: Learned invariant feature transform", ECCV, arXiv:1603.09114v2 [cs.CV] Jul. 29, 2016, (16 pages).
Zaheer, Manzil et al., "Deep Sets", 31st Conference on Neural Information Processing Systems (NIPS 2017), Long Beach, CA, USA; arXiv:1703.06114v3 [cs.LG] Apr. 14, 2018, (29 pages).

(56) References Cited

OTHER PUBLICATIONS

Zhang, Jiahui et al., "Learning two-view correspondences and geometry using order-aware network", ICCV; aarXiv:1908.04964v1 [cs.CV] Aug. 14, 2019, (11 pages).
Zhang, Li et al., "Dual graph convolutional net- work for semantic segmentation", BMVC, 2019; arXiv:1909.06121v3 [cs.CV] Aug. 26, 2020, (18 pages).
Extended European Search Report dated Mar. 4, 2021, European Patent Application No. 19768418.6, (9 pages).
Final Office Action dated Jun. 15, 2021, U.S. Appl. No. 16/928,313, (42 pages).
Final Office Action dated Mar. 1, 2021, U.S. Appl. No. 16/214,575, (29 pages).
Final Office Action dated Mar. 19, 2021, U.S. Appl. No. 16/530,776, (25 pages).
International Search Report and Written Opinion dated Feb. 12, 2021, International Application No. PCT/US20/60555, (25 pages).
Non Final Office Action dated Mar. 3, 2021, U.S. Appl. No. 16/427,337, (41 pages).
Sheng, Liu et al., "Time-multiplexed dual-focal plane head-mounted display with a liquid lens", Optics Letters, Optical Society of AMER I CA, US, vol. 34, No. 11, Jun. 1, 2009 (Jun. 1, 2009), XP001524475, ISSN: 0146-9592, pp. 1642-1644.
Communication Pursuant to Rule 164(1) EPC dated Jul. 27, 2021, European Patent Application No. 19833664.6, (11 pages).
Extended European Search Report dated Jun. 30, 2021, European Patent Application No. 19811971.1, (9 pages).
Extended European Search Report dated Jul. 16, 2021, European Patent Application No. 19810142.0 ,(14 pages).
Extended European Search Report dated Jul. 30, 2021, European Patent Application No. 19839970.1, (7 pages).
Final Office Action dated Jun. 15, 2021, United States U.S. Appl. No. 16/928,313, (42 pages).
Non Final Office Action dated Aug. 4, 2021, United States U.S. Appl. No. 16/864,721, (51 pages).
Non Final Office Action dated Jul. 9, 2021, U.S. Appl. No. 17/002,663, (43 pages).
Non Final Office Action dated Jul. 9, 2021, U.S. Appl. No. 16/833,093, (47 pages).
Non Final Office Action dated Jun. 10, 2021, U.S. Appl. No. 16/938,782, (40 Pages).
Non Final Office Action dated Jun. 29, 2021, U.S. Appl. No. 16/698,588, (58 pages).
Non Final Office Action dated May 26, 2021, U.S. Appl. No. 16/214,575, (19 pages).
Molchanov, Pavlo, et al., "Short-range FMCW monopulse radar for hand-gesture sensing", 2015 IEEE Radar Conference (RadarCon) (2015), pp. 1491-1496.
Sheng, Liu, et al., "Time-multiplexed dual-focal plane head-mounted display with a liquid Tens", Optics Letters, Optical Society of Amer I CA, US, vol. 34, No. 11, Jun. 1, 2009 (Jun. 1, 2009), XP001524475, ISSN: 0146-9592, pp. 1642-1644.
Extended European Search Report dated Sep. 28, 2021, European Patent Application No. 19845418.3, (13 pages).
Final Office Action dated Sep. 17, 2021, U.S. Appl. No. 16/938,782, (44 pages).
Non Final Office Action dated Sep. 20, 2021, U.S. Appl. No. 17/105,848, (56 pages).
Non Final Office Action dated Sep. 29, 2021, U.S. Appl. No. 16/748,193, (62 pages).

\* cited by examiner

HOMOGRAPHY TRANSFORMATION MATRICES BASED TEMPERATURE CALIBRATION OF A VIEWING SYSTEM

CROSS-REFERENCE TO RELATED APPLICATIONS

This application is a continuation of U.S. patent application Ser. No. 16/430,252, filed on Jun. 3, 2019, which claims priority from U.S. Provisional Patent Application No. 62/681,063, filed on Jun. 5, 2018, all of which is incorporated herein by reference in its entirety.

BACKGROUND

1). Field of the Disclosure

This disclosure pertains in general to a viewing system and more specifically to the use of a homography matrix for temperature calibration.

2). Discussion of Related Art

Modern computing and display technologies have facilitated development of visual perception devices such as "virtual reality" viewing devices. A virtual reality viewing device may be a wearable device that presents the user with two images, one for the left eye and one for the right eye. Objects in the images may differ from one another in a manner that allows the brain to process the objects as a three-dimensional object. When the images constantly change, movement in three-dimensions can be simulated. A virtual reality viewing device typically involves presentation of digital or virtual image information without transparency to other real-world objects.

Other visual perception devices, so called "augmented reality" viewing devices usually include technology that allows for the presentation of digital and virtual image information as an augmentation to visualization of the actual world around the user. An augmented reality viewing device may, for example, have one or more transparent eyepieces that allow the user to see real world objects behind the eyepieces. Such an eyepiece can serve as a wave guide through which light propagates from a projector towards an eye of the user. A light pattern created by the projector becomes visible on the retina of the eye. The retina of the eye then receives light from the real-world objects behind the eyepiece and light from the projector. Real world objects are thus augmented with image data from the projector, in the perception of the user.

Heat tends to aggregate in certain areas of such a viewing system so that the viewing system has a non-uniform temperature distribution. Addition, various materials expand/contract at different rates with temperature. Viewing systems such as these are typically calibrated at a steady state operating temperature, for example at 40° C. However, the time to reach a calibrated temperature from a "cold state" of room temperature may take several dozens of minutes, leaving a significant period of time during which the user may use the viewing system out of its calibration profile. Color separation is typically minimal at start up. A band of color separation typically increases as the viewing system heats up and then returns to a smaller band when the viewing system reaches its calibration temperature.

SUMMARY

The disclosure provides a viewing system including a storage device, a calibration set stored on the storage device, including one or more temperatures and one or more homography transformation matrices, each respective homography transformation matrix being for a respective temperature, a temperature sensor, a matrix selector that selects a respective one of the homography transformation matrices that is for a temperature matching a temperature detected by the temperature sensor, a geometric change calculator that calculates a geometric change based on the selected homography relationship, a data source to receive data representing local content, a render engine connected to the data source to receive the data and connected to the geometric change calculator to receive the geometric change and render the local content based on the geometric change and a display system connected to the render engine and adapted to display a rendering received from the render engine to a user.

The disclosure also provides a viewing method including storing a calibration set on the storage device, including one or more temperatures and a plurality of homography transformation matrices, each respective homography transformation matrix being for a respective temperature, detecting a temperature, selecting a respective one of the homography transformation matrices that is for a temperature matching the temperature, calculating a geometric change based on the selected homography relationship, receiving data representing local content, generating a rendering of the local content based on the geometric change and displaying the rendering to a user.

BRIEF DESCRIPTION OF THE DRAWINGS

The disclosure is further described by way of example with reference to the accompanying drawings, wherein.

DETAILED DESCRIPTION

Figure 1:
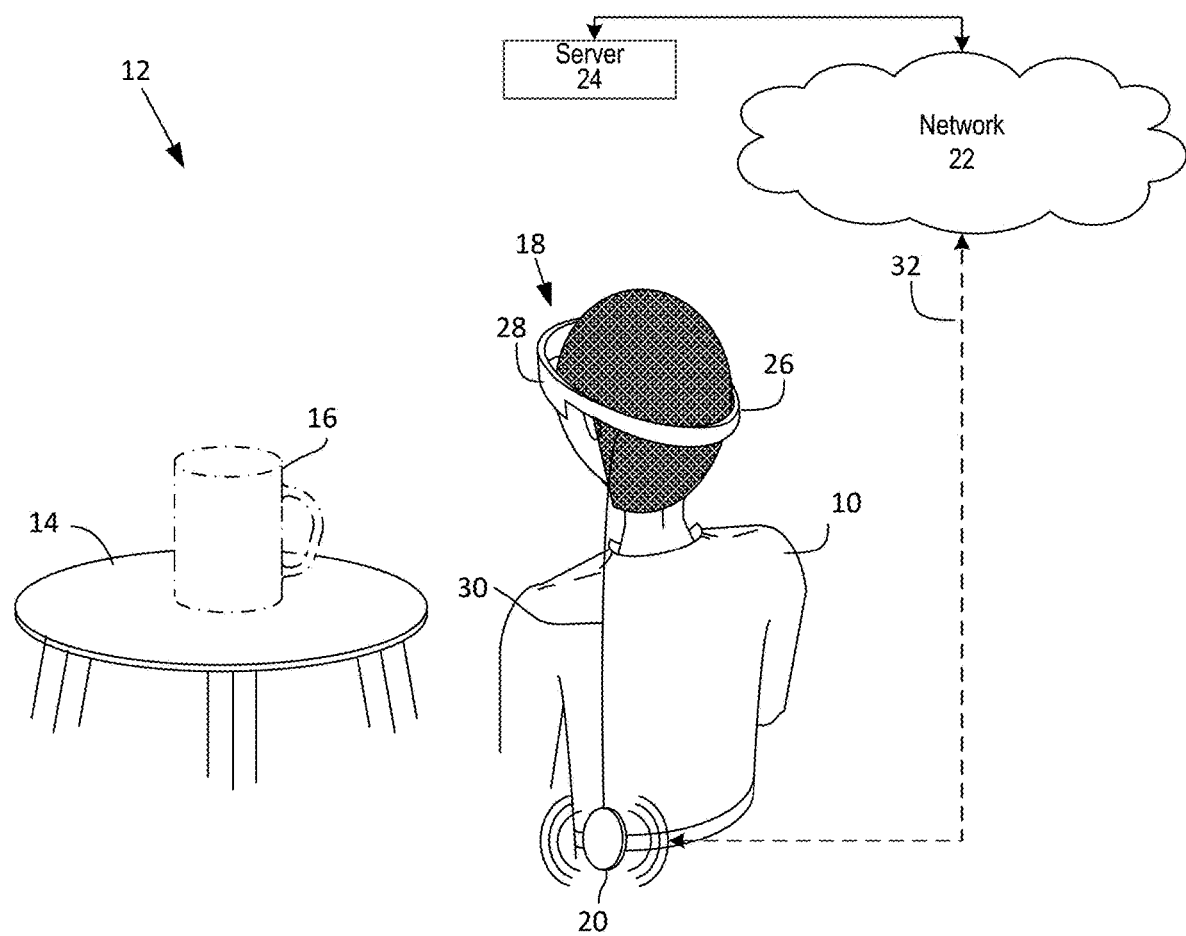
FIG. 1 is a perspective view of a viewer interacting with a viewing system, according to some embodiments.

FIG. 1 of the accompanying drawings illustrates a user 10, a viewing system 12, a real-world object 14 in the form of a table, and a virtual object 16 in the form of a mug, which, although illustrated, is not visible from the perspective of the figure but is visible to the user 10.

The viewing system 12 includes a head unit 18, a belt pack 20, a network 22, and a server 24.

The head unit 18 includes a head unit body 26 and a display system 28. The head unit body 26 has a shape that fits over a head of the user 10. The display system 28 is secured to the head unit body 26.

The belt pack 20 has a processor and a storage device connected to the processor. Vision algorithms and a temperature feedback system are stored on the storage device and are executable by the processor. The belt pack 20 is communicatively connected to the display system 28, for example, with a cable connection 30. The belt pack 20 further includes a network interface device that permits the belt pack 20 to connect wirelessly over a link 32 with the network 22. The server 24 is connected to the network 22.

In use, the user 10 secures the head unit body 26 to their head. The display system 28 includes an optical waveguide (not shown) that is transparent so that the user 10 can see the real-world object 14 through the waveguide.

The belt pack 20 may download image data from the server 24 over the network 22 and the link 32. The belt pack 20 provides the image data, for example through the cable connection 30, to the display system 28. The display system 28 has one or more projectors that create light based on the image data. The light propagates through the one or more optical waveguides to eyes of the user 10. Each waveguide creates light at a particular focal length on a retina of a respective eye so that the eye sees the virtual object 16 at some distance behind the display system 28. The eye thus sees the virtual object 16 in three-dimensional space. Additionally, slightly different images are created for each eye so that a brain of the user 10 perceives the virtual object 16 in three-dimensional space. The user 10 thus sees the real-world object 14 augmented with the virtual object 16 in three-dimensional space.

Figure 2:
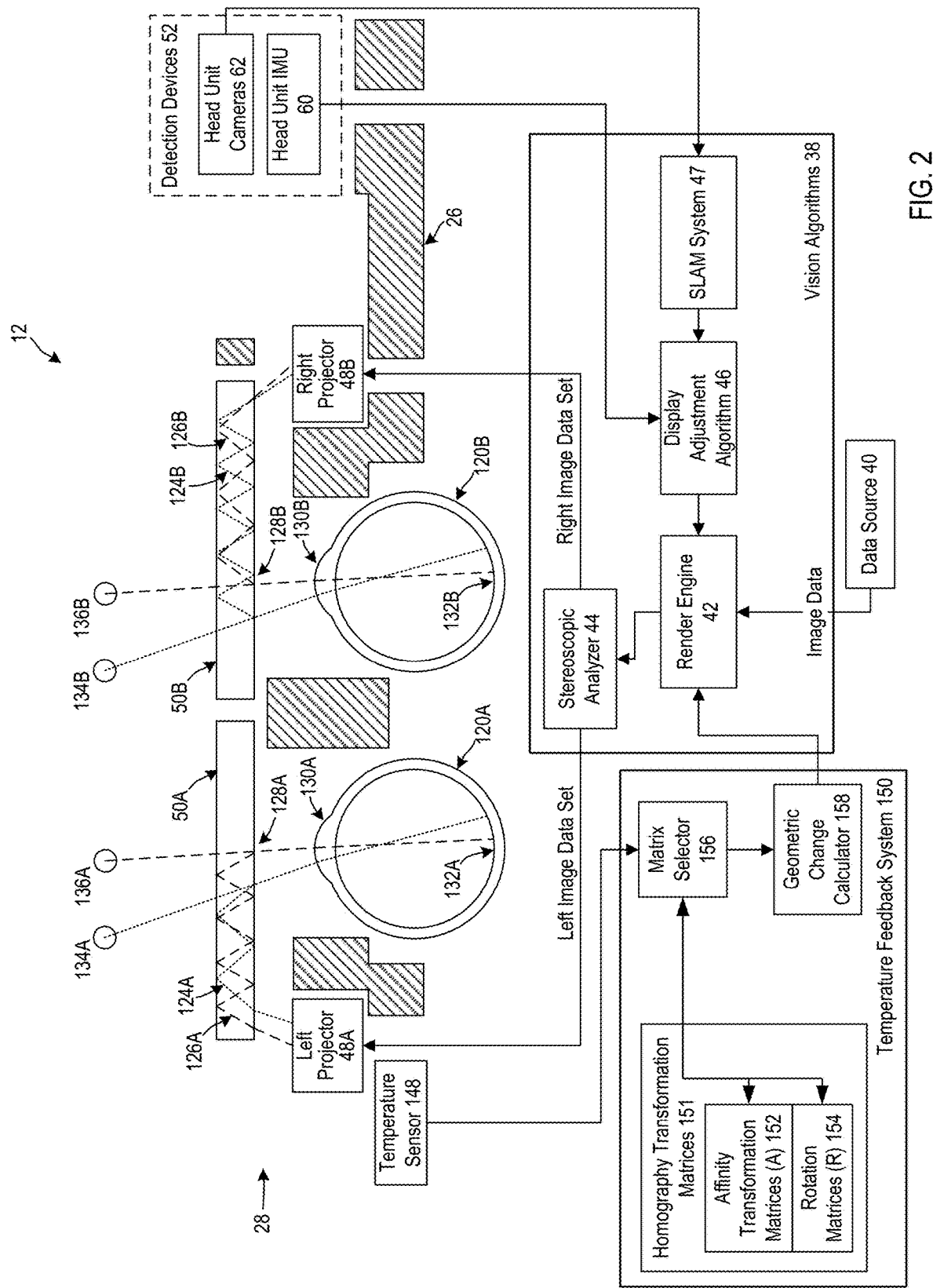
FIG. 2 is a partial top view and partial block diagram of the viewing system, according to some embodiments.

FIG. 2 illustrates the display system 28 in more detail together with vision algorithms 38. The vision algorithms 38 primarily reside within the belt pack 20 in FIG. 1. In other embodiments, the vision algorithms 38 may reside entirely within a head unit or may be split between a head unit and a belt pack.

FIG. 2 further includes a data source 40. In the present example, the data source 40 includes image data that is stored on a storage device of the belt pack 20. The image data may, for example, be three-dimensional image data that can be used to render the virtual object 16. In some embodiments, the image data may be time sequenced image data that allows for the creation of a video that moves in two or three dimensions, and may be located on a real-world object, or be in a fixed position in front of a user when the user moves their head.

The vision algorithms 38 include a render engine 42, a stereoscopic analyzer 44, a display adjustment algorithm 46 and a simultaneous localization and mapping (SLAM) system 47.

The render engine 42 is connected to the data source 40 and the display adjustment algorithm 46. The render engine 42 is capable of receiving inputs from various systems, in the present example the display adjustment algorithm 46, and positions the image data within a frame that is to be viewed by the user 10 based on the display adjustment algorithm 46. The display adjustment algorithm 46 is connected to the SLAM system 47. The SLAM system 47 is capable of receiving image data, analyzing the image data for purposes of determining objects within images of the image data, and recording the locations of the objects within the image data.

The stereoscopic analyzer 44 is connected to the render engine 42. The stereoscopic analyzer 44 is capable of determining left and right image data sets from a data stream that is provided by the render engine 42.

The display system 28 includes left and right projectors 48A and 48B, left and right waveguides 50A and 50B, and detection devices 52. The left and right projectors 48A and 48B are connected to power supplies. Each projector 48A or 48B has a respective input for image data to be provided to the respective projector 48A or 48B. The respective projector 48A or 48B, when powered, generates light in a two-dimensional pattern and emanates the light therefrom. The left and right waveguides 50A and 50B are positioned to receive the light from the left and right projectors 48A and 48B, respectively. The left and right waveguides 50A and 50B are transparent waveguides.

The detection devices 52 include a head unit inertial motion unit (IMU) 60 and one or more head unit cameras 62. The head unit IMU 60 includes one or more gyroscopes and one or more accelerometers. The gyroscopes and accelerometers are typically formed in a semiconductor chip and are capable of detecting movement of the head unit IMU 60 and the head unit body 26, including movement along three orthogonal axes and rotation about three orthogonal axes.

The head unit cameras 62 continually capture images from an environment around the head unit body 26. The images can be compared to one another to detect movement of the head unit body 26 and the head of the user 10.

The SLAM system 47 is connected to the head unit cameras 62. The display adjustment algorithm 46 is connected to the head unit IMU 60. One of ordinary skill in the art will appreciate that the connections between the detection devices 52 and the vision algorithms 38 are accomplished through a combination of hardware, firmware and software. The components of the vision algorithms 38 are linked to one another through subroutines or calls.

In use, the user 10 mounts the head unit body 26 to their head. Components of the head unit body 26 may, for example, include a strap (not shown) that wraps around the back of a head of the user 10. The left and right waveguides 50A and 50B are then located in front of left and right eyes 120A and 120B of the user 10.

The render engine 42 receives image data from the data source 40. The render engine 42 enters the image data into the stereoscopic analyzer 44. The image data is three-dimensional image data of the virtual object 16 in FIG. 1. The stereoscopic analyzer 44 analyzes the image data to determine left and right image data sets based on the image data. The left and right image data sets are data sets that represent two-dimensional images that differ slightly from one another for purposes of giving the user 10 a perception of a three-dimensional rendering. In the present embodiment, the image data is a static data set that does not change over time.

The stereoscopic analyzer 44 enters the left and right image data sets into the left and right projectors 48A and 48B. The left and right projectors 48A and 48B then create left and right light patterns. The components of the display system 28 are shown in plan view, although it should be understood that the left and right patters are two-dimensional patterns when shown in front elevation view. Each light pattern includes a plurality of pixels. For purposes of illustration, light rays 124A and 126A from two of the pixels are shown leaving the left projector 48A and entering the left waveguide 50A. The light rays 124A and 126A reflect from sides of the left waveguide 50A. It is shown that the light rays 124A and 126A propagate through internal reflection from left to right within the left waveguide 50A, although it should be understood that the light rays 124A and 126A also propagate in a direction into the paper using refractory and reflective systems.

The light rays 124A and 126A exit the left light waveguide 50A through a pupil 128A and then enter a left eye 120A through a pupil 130A of the left eye 120A. The light rays 124A and 126A then fall on a retina 132A of the left eye 120A. In this manner, the left light pattern falls on the retina 132A of the left eye 120A. The user 10 is given the perception that the pixels that are formed on the retina 132A are pixels 134A and 136A that the user 10 perceives to be at some distance on a side of the left waveguide 50A opposing the left eye 120A. Depth perception is created by manipulating the focal length of the light.

In a similar manner, the stereoscopic analyzer 44 enters the right image data set into the right projector 48B. The right projector 48B transmits the right light pattern, which is represented by pixels in the form of light rays 124B and 126B. The light rays 124B and 126B reflect within the right waveguide 50B and exit through a pupil 128B. The light rays 124B and 126B then enter through a pupil 130B of the right eye 120B and fall on a retina 132B of a right eye 120B. The pixels of the light rays 124B and 126B are perceived as pixels 134B and 136B behind the right waveguide 50B.

The patterns that are created on the retinas 132A and 132B are individually perceived as left and right images. The left and right images differ slightly from one another due to the functioning of the stereoscopic analyzer 44. The left and right images are perceived in a mind of the user 10 as a three-dimensional rendering.

As mentioned, the left and right waveguides 50A and 50B are transparent. Light from a real-life object on a side of the left and right waveguides 50A and 50B opposing the eyes 120A and 120B can project through the left and right waveguides 50A and 50B and fall on the retinas 132A and 132B. In particular, light from the real-world object 14 in FIG. 1 falls on the retinas 132A and 132B so that the user 10 can see the real-world object 14. An augmented reality is created wherein the real-world object 14 is augmented with a three-dimensional rendering of the virtual object 16 that is perceived by the user 10 due to the left and right images that are, in combination, perceived by the user 10.

The head unit IMU 60 detects every movement of the head of the user 10. Should the user 10, for example, move their head counterclockwise and simultaneously move their body together with their head towards the right, such movement will be detected by the gyroscopes and accelerometers in the head unit IMU 60. The head unit IMU 60 provides the measurements from the gyroscopes and the accelerometers to the display adjustment algorithm 46. The display adjustment algorithm 46 calculates a placement value and provides the placement value to the render engine 42. The render engine 42 modifies the image data received from the data source 40 to compensate for the movement of the head of the user 10. The render engine 42 provides the modified image data to the stereoscopic analyzer 44 for display to the user 10.

The head unit cameras 62 continually capture images as the user 10 moves their head. The SLAM system 47 analyzes the images and identifies images of objects within the image. The SLAM system 47 analyzes movement of the objects to determine a pose position of the head unit body 26. The SLAM system 47 provides the pose position to the display adjustment algorithm 46. The display adjustment algorithm 46 uses the pose position to further refine the placement value that the display adjustment algorithm 46 provides to the render engine 42. The render engine 42 thus modifies the image data received from the data source 40 based on a combination of the motion sensors in the head unit IMU 60 and images taken by the head unit cameras 62. By way of a practical example, if the user 10 rotates their head to the right, a location of the virtual object 16 rotates to the left within the view of the user 10 thus giving the user 10 the impression that the location of the virtual object 16 remains stationary relative to the real-world object 14.

Figure 3:
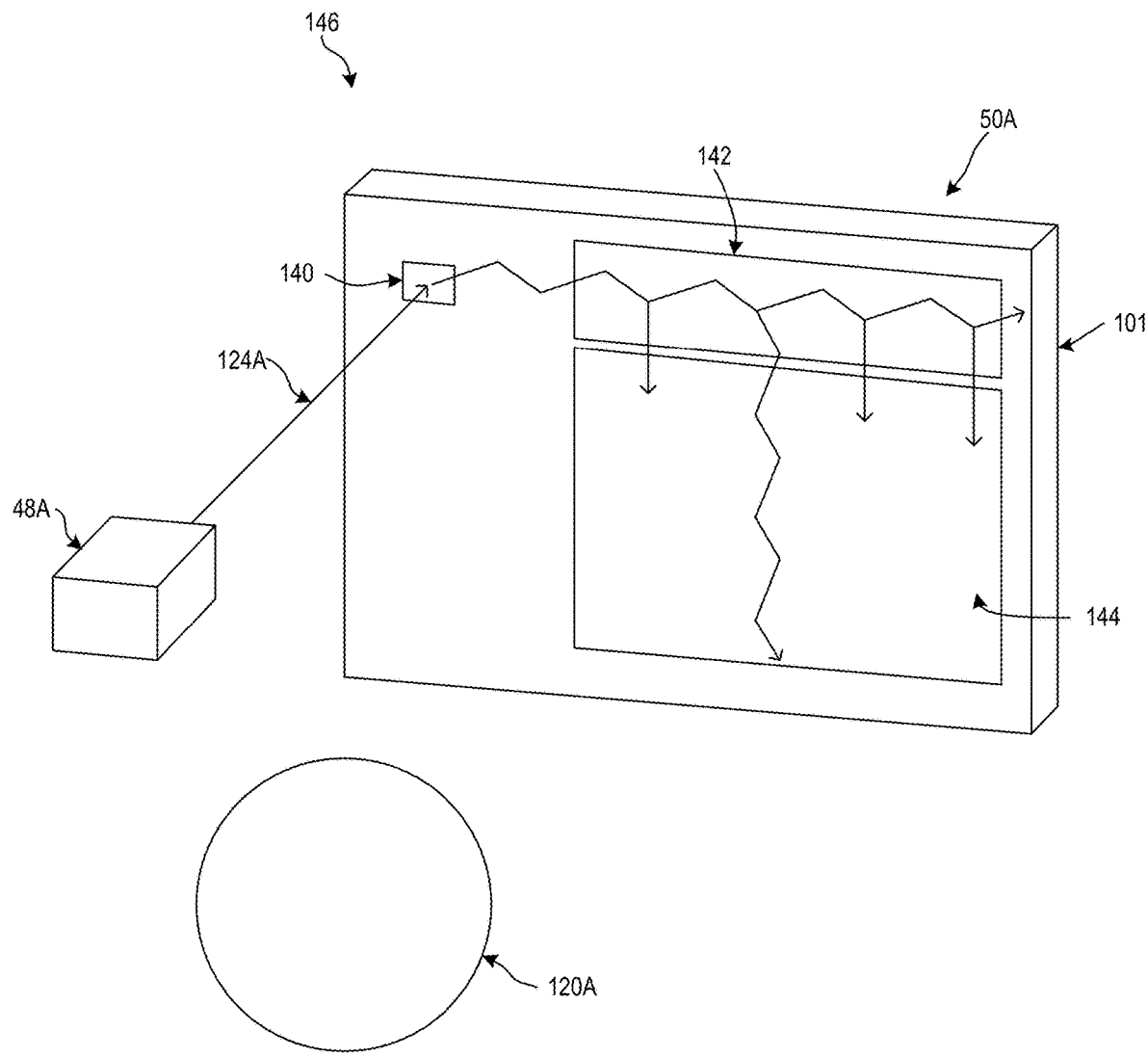
FIG. 3 is a perspective view of one display of the viewing system and one eye of the user, according to some embodiments.

FIG. 3 illustrates, in more detail, the path that one of the light rays, in the particular case the light ray 124A follows. The light ray 124A enters the left waveguide 50A through an incoupling grating 140. The light ray 124A encounters a number of diffractive optical elements, in particular the incoupling grating 140, an orthogonal pupil expander 142, and an exit pupil expander 144 on or within the left waveguide 50A and together with the left projector 48A form part of a left display system 146. As the light ray 124A propagates through the left waveguide 50A, the diffractive optical elements redirect the light in different ways, ultimately resulting in image light exiting the left waveguide 50A through multiple pupils of the exit pupil expander 144 towards the left eye 120A. The left eye 120A can then focus on image light from one of the pupils so that the image light falls on the retina 132A in FIG. 2 so as to perceive the virtual object 16 in FIG. 1.

Referring again to FIG. 2, the viewing system 12 further includes a temperature sensor 148 and a temperature feedback system 150.

The temperature sensor 148 is mounted in a fixed position to the head unit body 26. The temperature sensor 148 is located sufficiently close to one of the left or right waveguides 50A or 50B to detect the temperature of the left and right waveguides 50A and 50B. In some embodiments, the temperature sensor 148 may be between the left and right waveguides 50A and 50B. In some embodiments, there may be multiple temperature sensors, for example, a first temperature sensor sufficiently close to the left waveguide 50A and a second temperature sensor sufficiently close to the right waveguide 50B.

The temperature feedback system 150 includes homography transformation matrices 151 including affinity transformation matrices (A) 152, rotation matrices (R) 154, a matrix selector 156, and a geometric change calculator 158. The homography transformation matrices 151 may be computed as the product of the affinity transformation matrices 152 and the rotation matrices 154, wherein the rotation matrices 154 are defined by rotation vectors. In some embodiments, the rotation vectors may be Rodrigues' vectors. In some embodiments, the matrix selector 156 is a software routine that is connected through hardware and software connections to temperature sensor 148. The temperature sensor 148 provides a signal to the matrix selector 156. The signal provided by the temperature sensor 148 to the matrix selector 156 includes data representing a temperature that is sensed by the temperature sensor 148.

The homography transformation matrices 151 include a respective homography transformation matrix for each color channel of one or more color channels. In addition, the homography transformation matrices 151 vary by temperature for each color channel. Each homography transformation matrix corresponds to a respective temperature. The affinity transformation matrices 152 include a respective affinity transformation matrix for each color channel of one or more color channels. In addition, the affinity transformation matrices 152 vary by temperature for each color channel. Each affinity transformation matrix corresponds to a respective temperature. In some embodiments, each transformation matrix (e.g., homography transformation matrix and/or affinity transformation matrix) corresponds to a respective temperature range. For example, each transformation matrix may correspond to a range of temperatures within a percentage (e.g., 5%) of a particular (absolute) temperature. One of ordinary skill in the art would appreciate that the range of temperatures may be defined in other ways, for example, with respect to temperature units such as degrees Celsius. The rotation matrices 154 also vary according to temperature. Each rotation matrix corresponds to a respective temperature. In some embodiments, each rotation matrix corresponds to a respective temperature range, for example as described above with respect to the transformation matrix.

The geometric change calculator 158 is connected to the matrix selector 156. The geometric change calculator 158 provides an output to the render engine 42.

In use, the temperature sensor 148 continually measures a temperature of the viewing system 12. The matrix selector 156 receives the temperature from the temperature sensor 148. In some embodiments, the matrix selector 156 retrieves homography transformation matrices for all the color channels for the temperature from the homography transformation matrices 151. In some embodiments, the matrix selector 156 retrieves affinity transformation matrices for all the color channels for the temperature from the affinity transformation matrices 152, and retrieves a rotation matrix corresponding to the temperature from the rotation matrices 154. In some embodiments, the rotation matrix from the rotation matrices 154 may be represented as a rotation vector.

In some embodiments, the matrix selector 156 provides the selected homography transformation matrices for the temperature to the geometric change calculator 158. In some embodiments, the matrix selector 156 provides the selected affinity transformation matrices for the temperature and the selected rotation matrices for the temperature to the geometric change calculator 158. In some embodiments, the geometric change calculator 158 then calculates homography transformations based on the selected homography transformation matrices. In some embodiments, the geometric change calculator 158 then calculates shifts and rotations based on the selected affinity transformation matrices and rotation matrices. In some embodiments, the homography transformations establish the location of each color channel in the left and right waveguides 50A and 50B. In some embodiments, the combination of shifts and rotations establish the location of each color channel in the left and right waveguides 50A and 50B. In some embodiments, the render engine 42 receives the homography transformations from the geometric change calculator 158. In some embodiments, the render engine 42 receives the shifts and transformations from the geometric change calculator 158. It should be noted that no correction is made to compensate for any shift or rotation. Instead, the render engine 42 bases the rendering that is created by the render engine 42 on the locations of the various color channels. For example, if a shift of 0.05 arcmin has occurred, the render engine 42 first determines what has to be displayed at the shifted location and then renders the virtual object 16 so that is correctly displayed at the shifted location.

What should be noted is that no lookup table is used for storing correction data for every pixel of the display. Instead, a much smaller file component is used. In some embodiments, the much smaller file component is in the form of one or more homography transformation matrices. In some embodiments, the much smaller file component is in the form of one or more affinity transformation matrices and one or more rotation matrices. The processing of such transformation matrices and rotation matrices is minimal compared to the use of a lookup table which is a highly processor intensive technique. In addition, the affinity transformation matrices and rotation matrices may be linearized and represented by a simple formula that is stored in memory and used by the processor of the viewing system.

Figure 4:
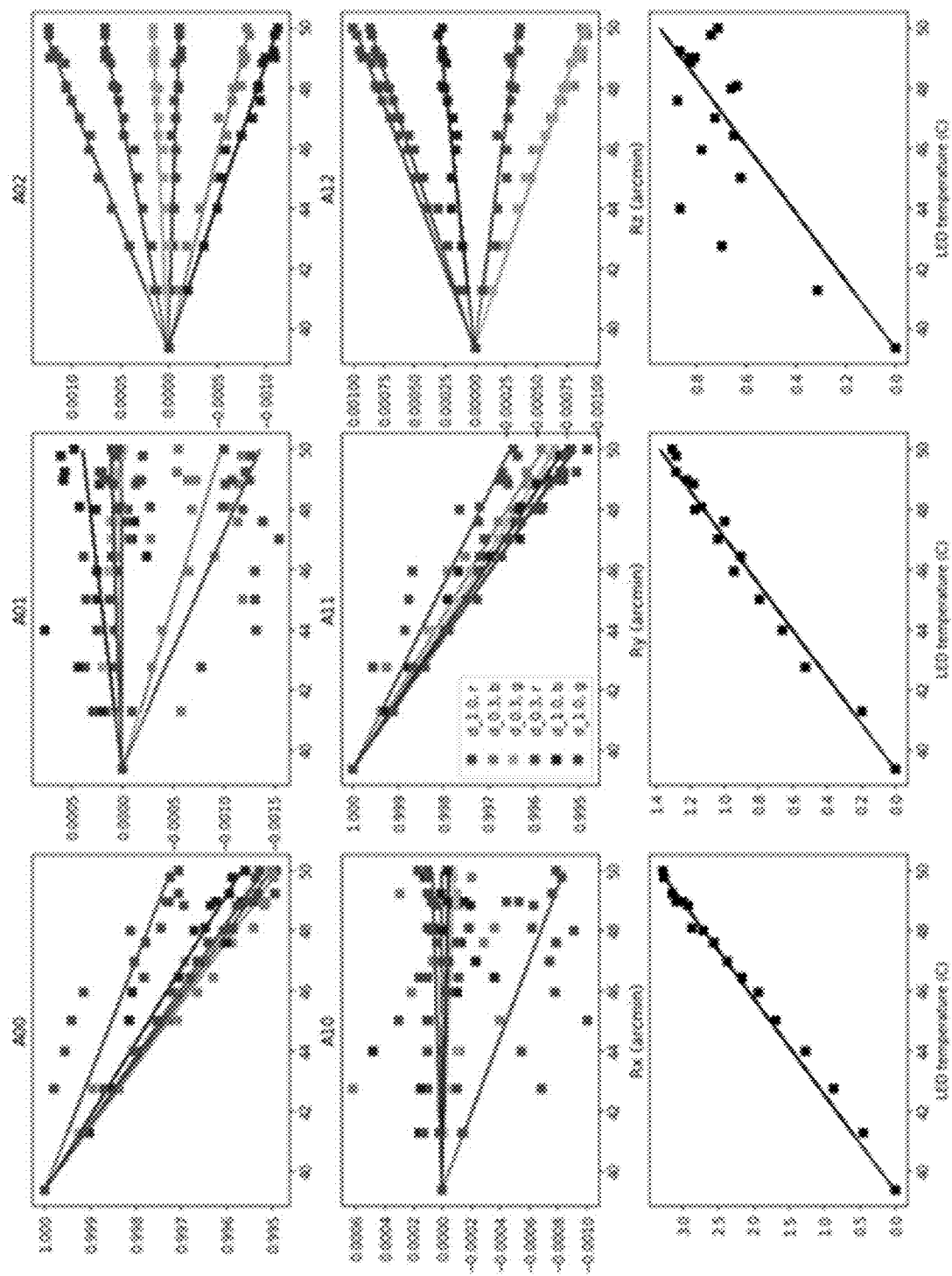
FIG. 4 is a two-by-three affinity transformation matrix and a three component rotation vector, illustrating a change in the affinity transformation matrix and the vector with an increase in temperature and by color channel for a left display of the viewing system, according to some embodiments.
Figure 5:
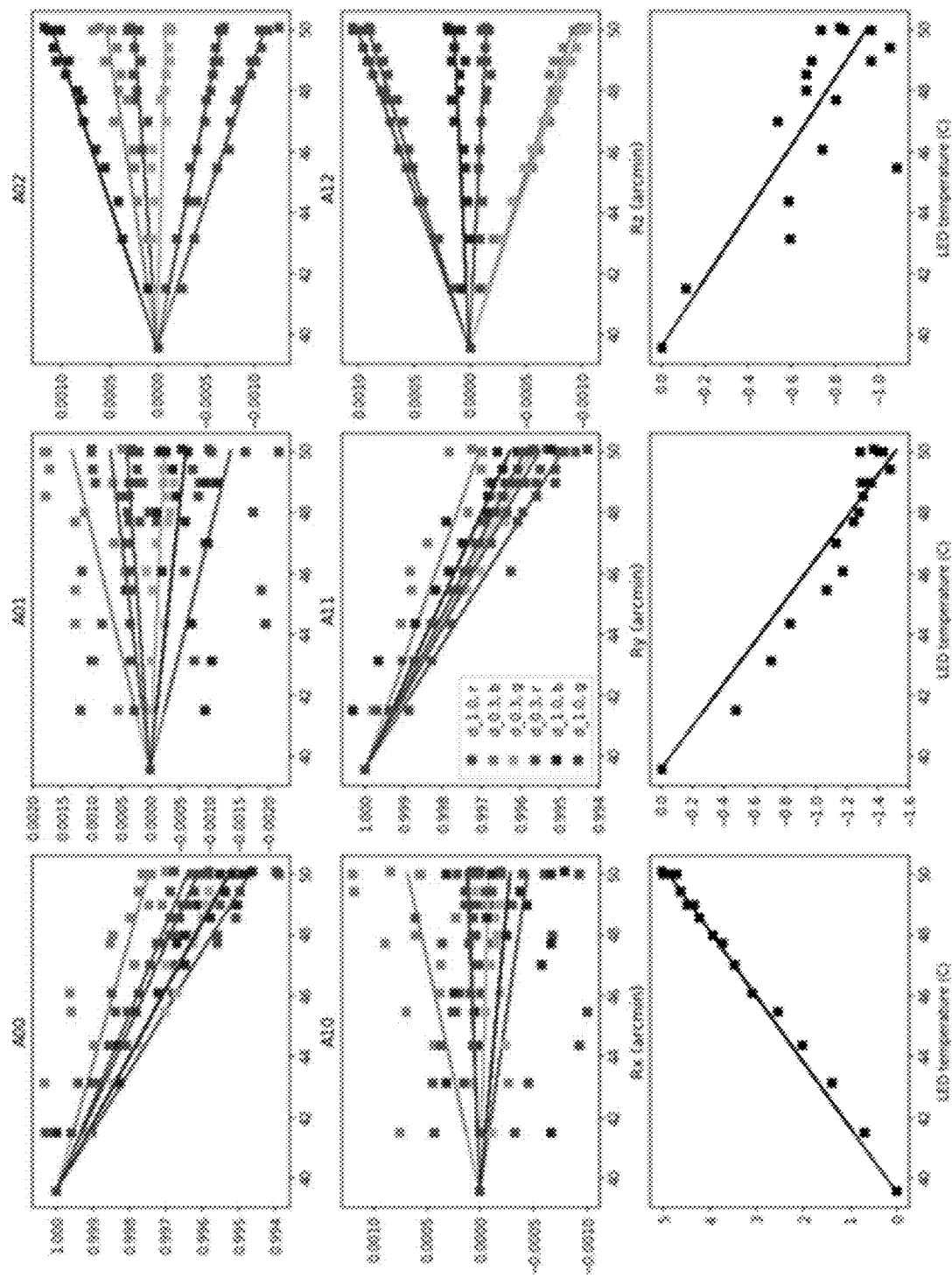
FIG. 5 is a two-by-three affinity transformation matrix and a three component rotation vector, illustrating a change in the affinity transformation matrix and the vector with an increase in temperature and by color channel for a right display of the viewing system, according to some embodiments.

FIGS. 4 and 5 show nine display parameters vs. temperature for the left display and the right display, respectively. Solid lines are linear fit aggregates through the first data point. An affine transformation is used to describe the change with temperature. $p_i^0=(x_i^0,y_i^0)$ is the normalized light ray direction at temperature $T^0$, where i=1 . . . Row*Col. $p_i''=(x_i'', y_i'')$ is the normalized light ray direction at temperature T. We find the 2D affine transformation $A=[[A_{00}, A_{01}, A_{02}], [A_{10}, A_{11}, A_{12}]]$ that satisfies $p_i''=A\, p_i^0$ for all i's as closely as possible.

The slopes of the parameters in FIGS. 4 and 5 may be pre-computed. Online correction may be based on factory calibration data. For example, Table 1, the underlined values are the look-up table values of pixel (0,0)'s at 45.1666 degrees C.

TABLE 1

| Calibration | | |
|---|---|---|
| Left LED temp | 45.16666667 | |
| Side | Left | |
| Top left element diopter: 0.65 | LUT_x(0, 0) | LUT_y(0, 0) |
| Channel: 0 | −0.3699285066 | −0.2791998071 |

Then at the measured temperature, the delta of affine transform matrix A is calculated according to dA=dT*A_slope. In Table 2 the underlined values are calculated at 26 degrees C.

TABLE 2

| Left LED temp | 26 | |
|---|---|---|
| dT | −19.1666667 | |
| dA= | dT*A_slope | |
| 0.005715459746 | −0.000679414 | 0.001154466 |
| −0.000523419 | 0.005196848183 | 0.001293361 |

In order to obtain a normalized vector, 1 is added to (0,0) and (1,1) elements to obtain the affine transform matrix A in Table 3.

TABLE 3

| A | | |
|---|---|---|
| 1.00571546 | −0.000679414 | 0.001154466 |
| −0.000523419 | 1.005196848 | 0.001293361 |

Next, the affine transform matrix is applied to the values in step Table 1 to obtain the new look up table values for pixel (0,0) as shown in Table 4. *Advanced Methods in Computer Graphics: With examples in OpenGL* by Ramakrishnan Mukundan describes the formulas that are used to determine the correction values from an affine transformation matrix.

TABLE 4

| New_LUT_x(0, 0) | New_LUT_y(0, 0) |
|---|---|
| −0.37069866 | −0.27916378 |

The change of the display rotation (extrinsics) may be represented as $_{wrig}R_{disp}$ which can be parameterized as a three-component rotation vector $(R_x, R_y, R_z)$.

The following trends can be observed:
- $A_{00}$ and $A_{11}$, decreases linearly with temperature, suggesting that lookup table 'shrinks' with increasing temperature, i.e. virtual content will appear smaller as temperature increases. The scale-down factor is 0.05% per degree C.
- $A_{02}$ and $A_{12}$ varies linearly with temperature and the slope is channel-dependent. This suggests that colors are separated and cross-depth-plane alignment degrades as temperature increases. The color/depth separation is 0.5 arcmin per degree C.
- $R_x$ increases linearly with temperature for both left and right displays. Suggesting that virtual content moves up by 0.4 arcmin per degree C. increase in temperature.
- $R_y$ increases in left display and decreases in right display, suggesting that virtual content appears closer as temperature increases at a rate of 0.002 diopter per degree C.

A person of ordinary skill in the art will readily recognize that, instead of an affinity matrix and a rotation matrix, one can use a single homography matrix A=[[A00, A01, A02], [A10, A11, A12], [A20, A21, A22]].

To show that verification errors can be corrected by adjusting these nine parameters linearly based on temperature difference, display verification measurement in three cases may be performed:
- coldcal_hotverify: viewing system is at ~50 degree C., but uses the calibration obtained at ~40 degree C. to do verification.
- correctedcal_hotverify: viewing system is at ~50 degree C., but uses the calibration obtained at ~40 degree C. and correct the calibration file using the above-mentioned nine parameters in FIGS. 4 and 5 in a linear way.
- hotcal_hotverify: viewing system is calibration and verified at ~50 degree C.

Figure 6:
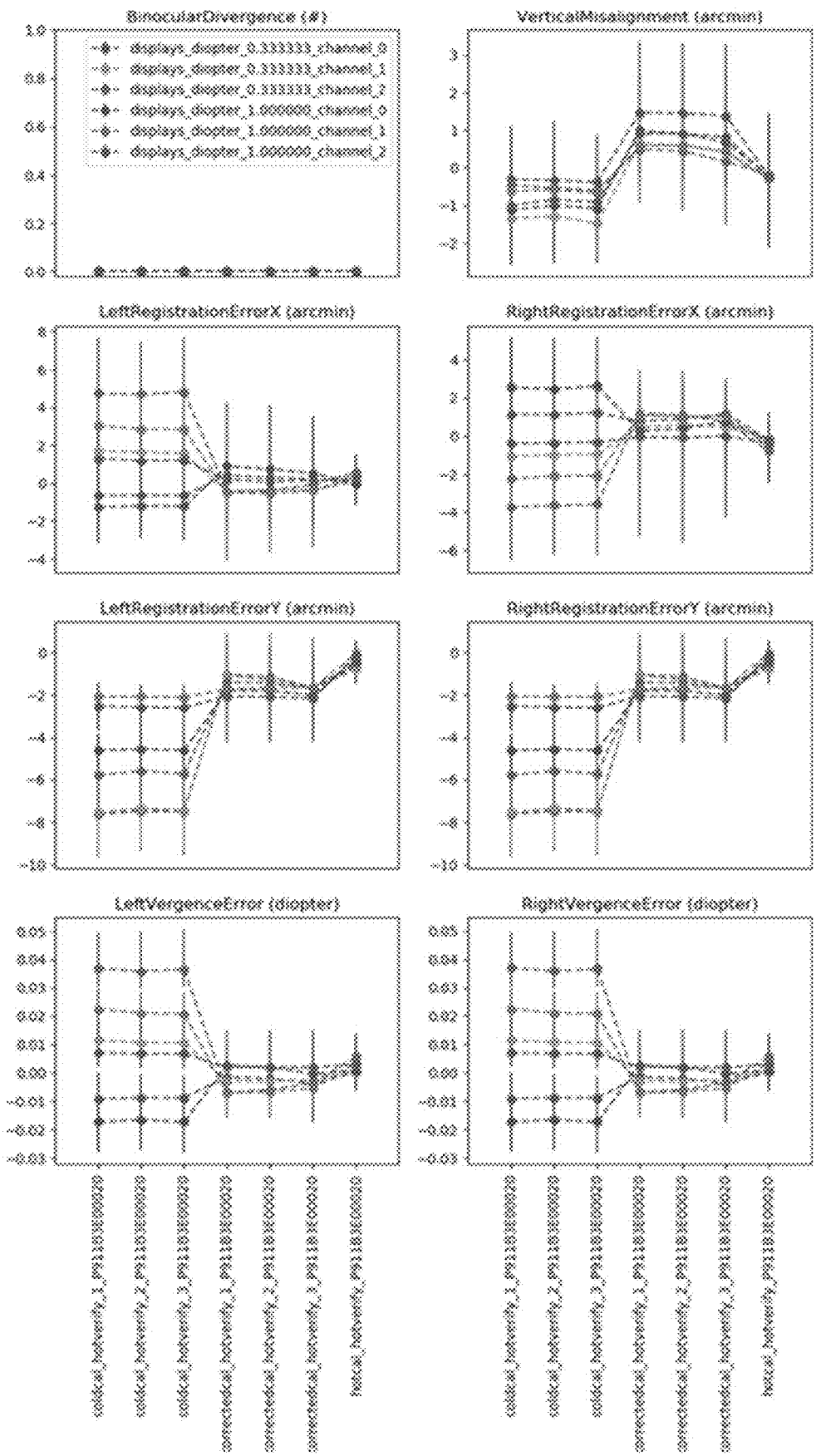
FIG. 6 illustrates graphs that show that display binocular verification errors are reduced, according to some embodiments.
Figure 7:
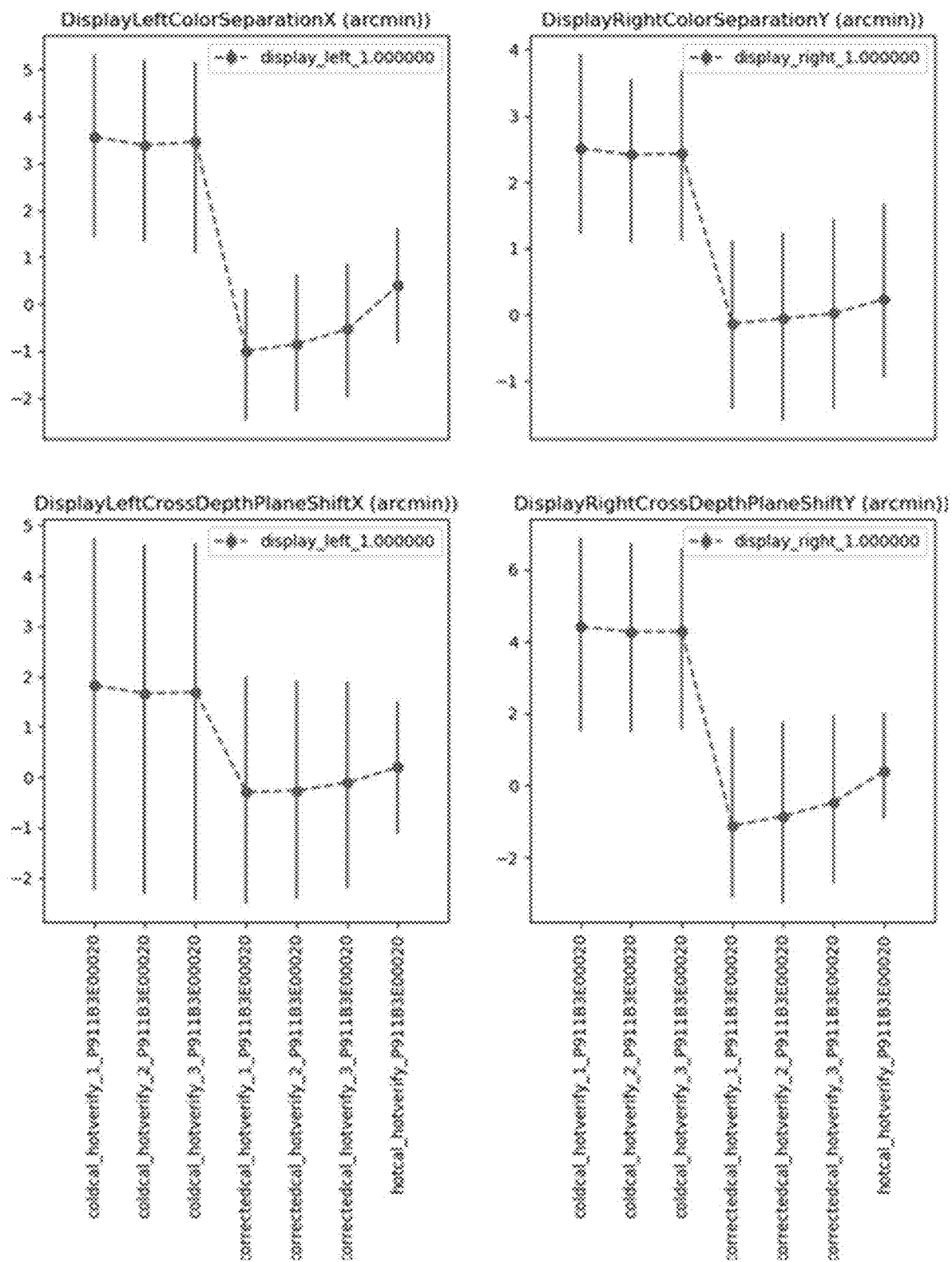
FIG. 7 includes graphs that show that monocular verification errors are reduced, according to some embodiments.

It is evident that the corrected calibration file is able to correct most of the verification errors. FIG. 6 shows that display binocular verification (in-situ) errors are reduced. FIG. 7 shows that monocular verification errors are reduced.

Figure 8:
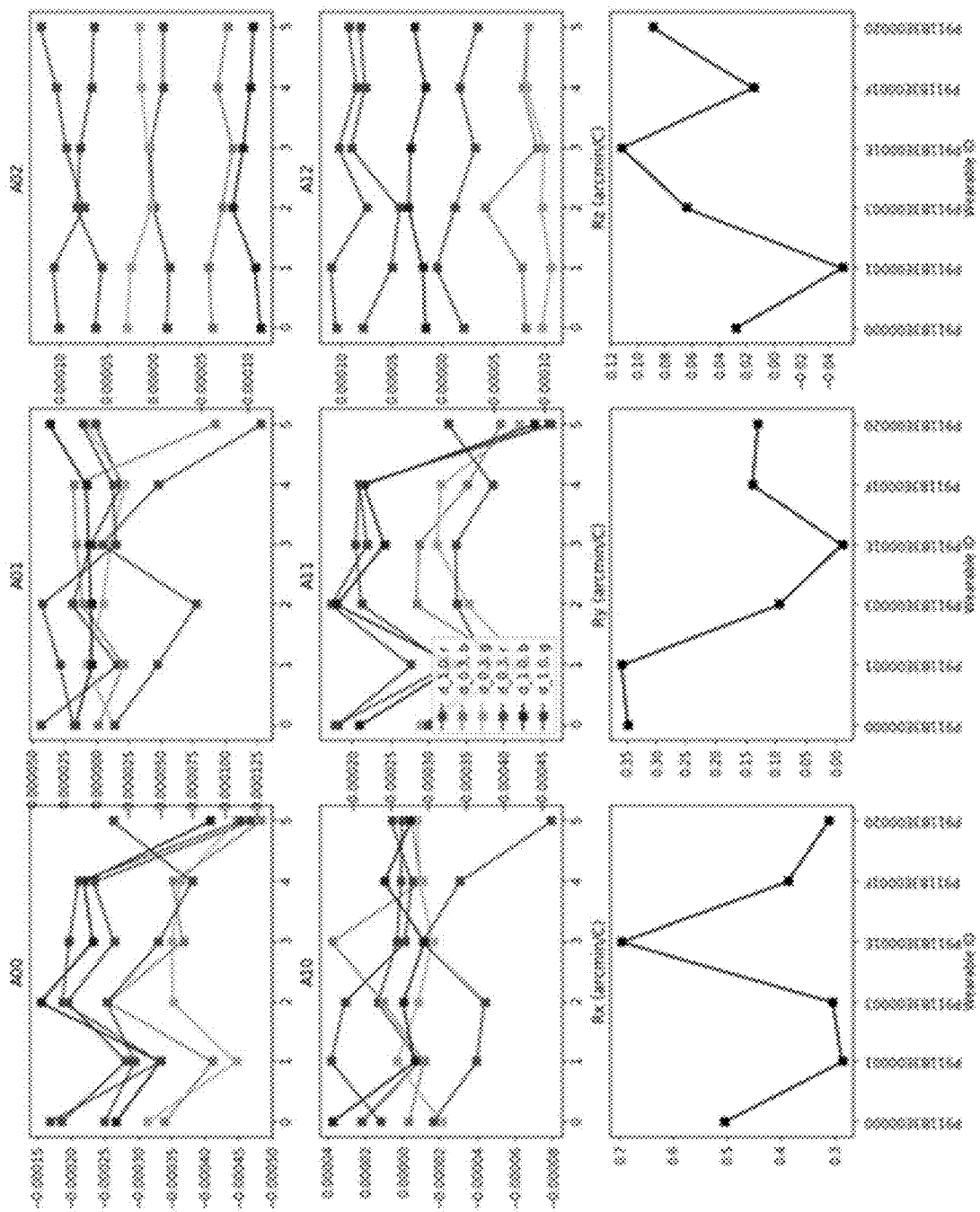
FIG. 8 includes affinity transformation matrices and rotation matrices of left displays showing temperature coefficients among six viewing systems, according to some embodiments.
Figure 9:
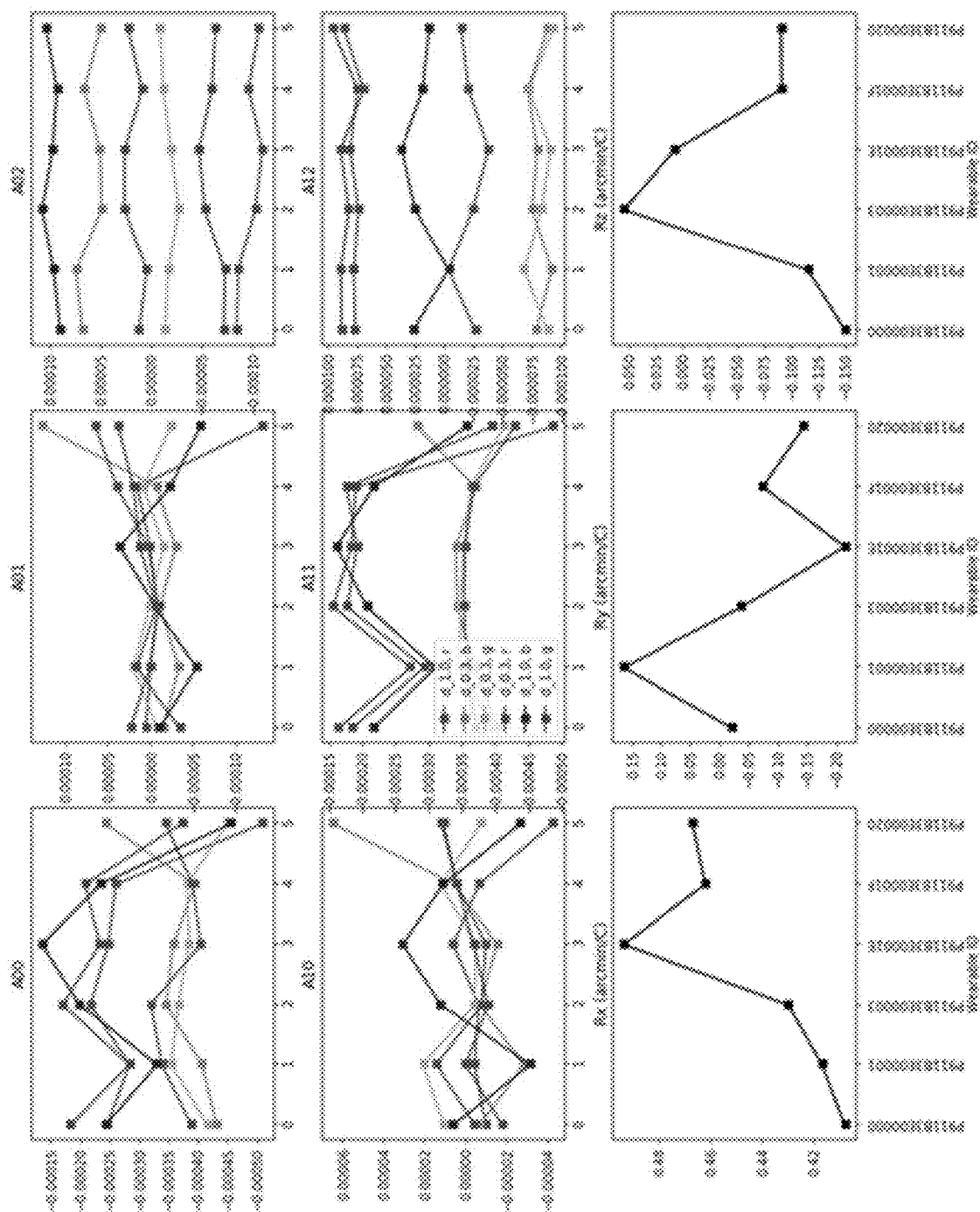
FIG. 9 includes affinity transformation matrices and rotation matrices of right displays showing temperature coefficients among six viewing systems, according to some embodiments.

FIGS. 8 and 9 show left and right display temperature coefficients among six viewing systems. The data shows that calibration of every viewing system at multiple temperatures is required.

Figure 10:
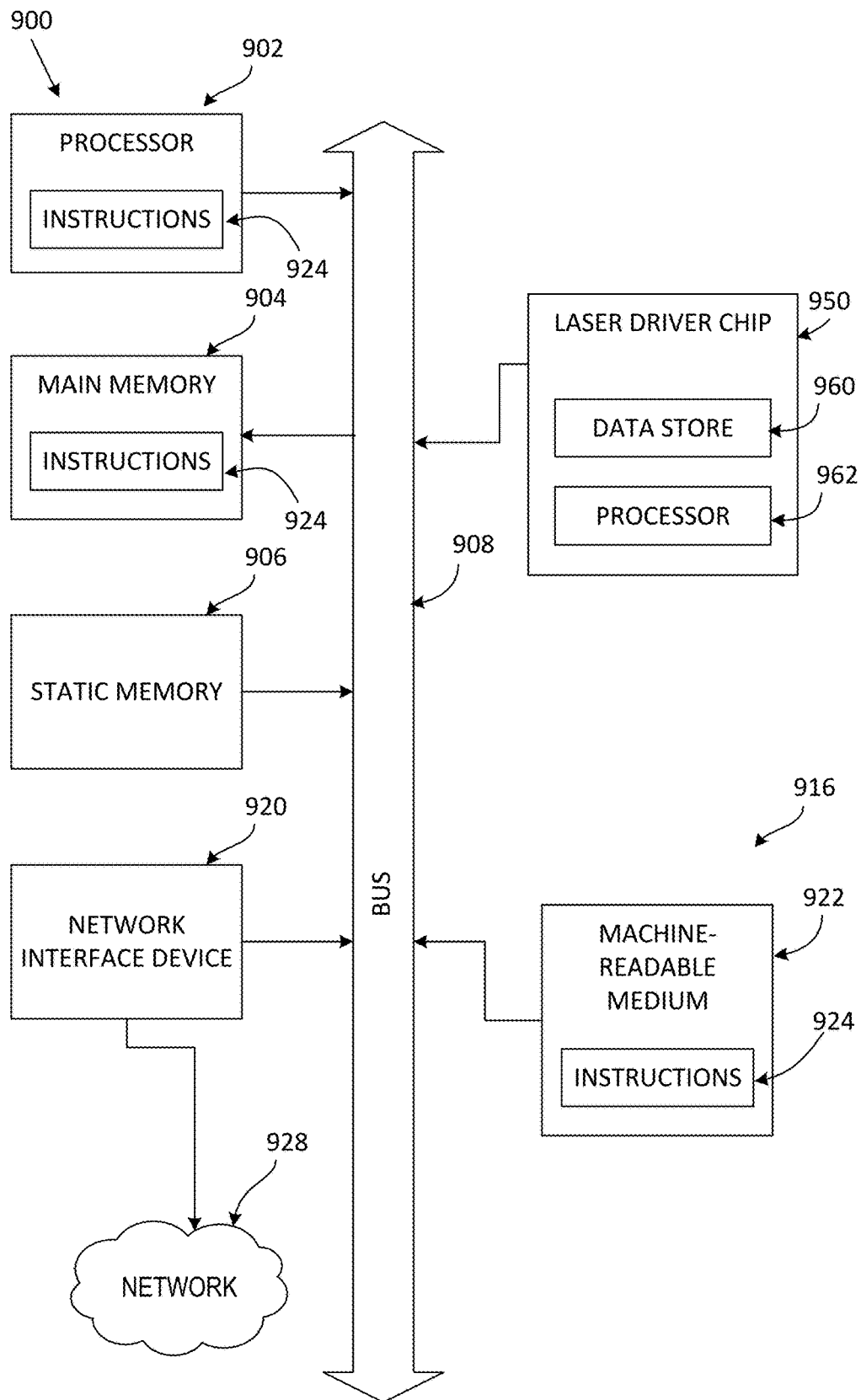
FIG. 10 is a block diagram of a machine in the form of a computer that can find application in the disclosed system, according to some embodiments.

FIG. 10 shows a diagrammatic representation of a machine in the exemplary form of a computer system 900 within which a set of instructions, for causing the machine to perform any one or more of the methodologies discussed herein, may be executed, according to some embodiments. In alternative embodiments, the machine operates as a standalone viewing system or may be connected (e.g., networked) to other machines. Further, while only a single machine is illustrated, the term "machine" shall also be taken to include any collection of machines that individually or jointly execute a set (or multiple sets) of instructions to perform any one or more of the methodologies discussed herein.

The exemplary computer system 900 includes a processor 902 (e.g., a central processing unit (CPU), a graphics processing unit (GPU) or both), a main memory 904 (e.g., read only memory (ROM), flash memory, dynamic random access memory (DRAM) such as synchronous DRAM (SDRAM) or Rambus DRAM (RDRAM), etc.), and a static memory 906 (e.g., flash memory, static random access memory (SRAM), etc.), which communicate with each other via a bus 908.

The computer system 900 may further include a disk drive unit 916, and a network interface device 920.

The disk drive unit 916 includes a machine-readable medium 922 on which is stored one or more sets of instructions 924 (e.g., software) embodying any one or more of the methodologies or functions described herein. The software may also reside, completely or at least partially, within the main memory 904 and/or within the processor 902 during execution thereof by the computer system 900, the main memory 904 and the processor 902 also constituting machine-readable media.

The software may further be transmitted or received over a network 928 via the network interface device 920.

The computer system 900 includes a laser driver chip 950 that is used to drive projectors to generate laser light. The laser driver chip 950 includes its own data store 960 and its own processor 962.

While the machine-readable medium 922 is shown in an exemplary embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding, or carrying a set of instructions for execution by the machine and that cause the machine to perform any one or more of the methodologies of the present disclosure. The term "machine-readable medium" shall accordingly be taken to include, but not be limited to, solid-state memories, optical and magnetic media, and carrier wave signals.

While certain exemplary embodiments have been described and shown in the accompanying drawings, it is to be understood that such embodiments are merely illustrative and not restrictive of the current disclosure, and that this disclosure is not restricted to the specific constructions and arrangements shown and described since modifications may occur to those ordinarily skilled in the art.

What is claimed:

1. A viewing system comprising:
   a storage device;
   a calibration set stored on the storage device, including a plurality of temperatures and a plurality of affinity transformation matrices (A), each respective affinity transformation matrix being for a respective temperature;
   a temperature sensor;
   a matrix selector that selects a respective one of the affinity transformation matrices that is for a temperature matching a temperature detected by the temperature sensor;
   a geometric change calculator that calculates a geometric change based on the selected affinity relationship;

a data source to receive data representing local content;

a render engine connected to the data source to receive the data and connected to the geometric change calculator to receive the geometric change and render the local content based on the geometric change; and a display system connected to the render engine and adapted to display a rendering received from the render engine to a user.

2. The viewing system of claim 1, wherein each temperature of the calibration set has a plurality of color affinity transformation matrices, the data including a plurality of color channels, the matrix selector selecting plurality of the color affinity transformation matrices matching the temperature detected by the temperature sensor, and the render engine rendering a plurality of color renderings, each color rendering being based on a respective one of the selected color affinity transformation matrix and local content of a respective one of the color channels.

3. The viewing system of claim 2, wherein each affinity transformation matrix (A) is a two-dimensional (2D) transformation matrix ($[[A_{00}, A_{01}, A_{02}], [A_{10}, A_{11}, A_{12}]]$).

4. The viewing system of claim 3, wherein color separation between the color channels for $A_{00}$ increases with an increase in temperature.

5. The viewing system of claim 3, wherein $A_{00}$ for all color channels decrease with an increase in temperature.

6. The viewing system of claim 3, wherein color separation between the color channels for $A_{01}$ increases with an increase in temperature.

7. The viewing system of claim 3, wherein $A_{01}$ for at least one color channel decreases with an increase in temperature and increases for one color channel with an increase in temperature.

8. The viewing system of claim 3, wherein color separation between the color channels for $A_{02}$ increases with an increase in temperature.

9. The viewing system of claim 3, wherein $A_{02}$ for at least one color channel decreases with an increase in temperature and increases for one color channel with an increase in temperature.

10. The viewing system of claim 3, wherein color separation between the color channels for $A_{10}$ increases with an increase in temperature.

11. The viewing system of claim 3, wherein $A_{10}$ for at least one color channel decreases with an increase in temperature and increases for one color channel with an increase in temperature.

12. The viewing system of claim 3, wherein color separation between the color channels for $A_{11}$ increases with an increase in temperature.

13. The viewing system of claim 3, wherein $A_{11}$ for all color channels decrease with an increase in temperature.

14. The viewing system of claim 3, wherein color separation between the color channels for $A_{12}$ increases with an increase in temperature.

15. The viewing system of claim 3, wherein $A_{12}$ for at least one color channel decreases with an increase in temperature and increases for one color channel with an increase in temperature.

16. The viewing system of claim 1, wherein the calibration set includes a plurality of rotation vectors (R), each respective rotation vector being for a respective temperature, wherein the matrix selector selects a respective one of the rotation vectors that is for the temperature matching the temperature detected by the temperature sensor, wherein the geometric change calculator calculates a geometric change based on the rotation vector, and wherein the render engine receives the geometric change and renders the local content based on the geometric change based on the rotation vector.

17. The viewing system of claim 16, wherein the rotation vector (R) is a three-component rotation vector ($[R_x, R_y, R_z]$).

18. The viewing system of claim 17, wherein $R_x$ increases linearly with an increase in temperature.

19. The viewing system of claim 17, wherein the display system has left and right displays and $R_y$ increases linearly with an increase in temperature for the left display and $R_y$ decreases linearly with an increase in temperature for the right display.

20. The viewing system of claim 1, further comprising:

a head unit body, wherein the display system includes at least one display having:

a transparent waveguide secured to the head unit body that permits light from real-world environment through to an eye of a user wearing the head unit body; and a projector that converts the data representing local content to light, the light from the projector entering into the waveguide at an entry pupil and leaving the waveguide at an exit pupil to the eye of the user.

21. A viewing method comprising:

storing a calibration set on a storage device, including a plurality of temperatures and a plurality of affinity transformation matrices (A), each respective affinity transformation matrix being for a respective temperature;

detecting a temperature;

selecting a respective one of the affinity transformation matrices that is for a temperature matching the temperature;

calculating a geometric change based on the selected affinity relationship;

receiving data representing local content;

generating a rendering of the local content based on the geometric change; and displaying the rendering to a user.

* * * * *